United States Patent
Stinson et al.

(10) Patent No.: US 7,117,093 B2
(45) Date of Patent: Oct. 3, 2006

(54) METHOD, MEDIA, AND SIGNALS FOR PROCESSING SEISMIC DATA TO OBTAIN A VELOCITY FIELD

(75) Inventors: Kerry James Stinson, Cochrane (CA); Shlomo Levy, Calgary (CA); Wai-Kin Chan, Calgary (CA); Edward Charles Crase, Butte, MT (US)

(73) Assignee: Data Modeling Inc., Calgary (CA)

( * ) Notice: Subject to any disclaimer, the term of this patent is extended or adjusted under 35 U.S.C. 154(b) by 135 days.

(21) Appl. No.: 10/790,186

(22) Filed: Mar. 2, 2004

(65) Prior Publication Data

US 2005/0197779 A1 Sep. 8, 2005

(51) Int. Cl.
*G01V 1/00* (2006.01)
*G01V 1/28* (2006.01)
*G06F 19/00* (2006.01)

(52) U.S. Cl. .................. 702/14; 702/18; 324/323; 367/14; 703/5

(58) Field of Classification Search .............. 702/14; 367/52–53
See application file for complete search history.

(56) References Cited

U.S. PATENT DOCUMENTS

| 5,297,108 | A |   | 3/1994  | Swan              |        |
|-----------|---|---|---------|-------------------|--------|
| 5,570,321 | A |   | 10/1996 | Bernitsas         |        |
| 5,640,368 | A |   | 6/1997  | Krebs             |        |
| 5,663,928 | A | * | 9/1997  | De Bazelaire et al.| 367/52|
| 5,978,314 | A | * | 11/1999 | Pham              | 367/52 |
| 5,982,706 | A |   | 11/1999 | Byun              |        |
| 6,289,285 | B1|   | 9/2001  | Neff et al.       |        |
| 6,493,634 | B1| * | 12/2002 | Krebs et al.      | 702/14 |

FOREIGN PATENT DOCUMENTS

EP 0 335 450 A2 10/1989
EP 0 335 450 A3 10/1989

OTHER PUBLICATIONS

Canning, A. "Organization and Imaging of Three-Dimensional Seismic Reflection Data Before Stack" (1993) Ph.D. Thesis, Rice University.

S. M. Deregowski, "Common-offset migrations and velocity analysis" (1990) 8:6 First Break 225.

P. Hubral, "Time-Migration—Some Ray Theoretical Aspects" (1977) 25 Geophysical Prospecting 738.

G. Gardner et al., "Dip Moveout and Prestack Imaging" (1988) Offshore Technology Conference (OTC 5158) 75.

A. Canning & G. Gardner, "A two-pass approximation to 3-D prestack migration" (1996) 61:2 Geophysics 409.

(Continued)

*Primary Examiner*—Bryan Bui
*Assistant Examiner*—Sujoy K. Kundu

(57) ABSTRACT

A method and apparatus for estimating a seismic velocity field from seismic data including time-amplitude representations associated with source-receiver locations spaced apart by an offset distance and having a midpoint therebetween, the seismic data being arranged into common midpoint (CMP) gathers associated with respective CMP locations. A control plane having an edge intersecting a plurality of the CMP locations is defined, an initial velocity field for the control plane is produced, the initial velocity field including a plurality of time-velocity values for each of the CMP locations; and an optimized velocity field for the control plane is produced by adjusting the time-velocity values for each of the CMP locations in response to trends, relative to offset distance, in time values, associated with common seismic events, until said optimized velocity field satisfies a condition.

55 Claims, 14 Drawing Sheets

OTHER PUBLICATIONS

V. Devaux et al., "3-D prestack depth migration by Kirchhoff operator splitting" (1996) 66th Annual International Meeting of Expl. Geophys. 455.

P.J. Fowler, "A comparative overview of prestack time migration methods" (1997) 67th Annual International Meeting of Expl. Geophys. 1571.

W. Kessinger, "Two-pass 3-D prestack depth imaging of the SEG salt model data" (1999) 69th Annual International Meeting of Expl. Geophys. 1095.

M. Taner & F. Koehler, "Velocity Spectra—Digital Computer Derivation and Applications of Velocity Functions" (1969) 34:6 Geophysics 859 (reprinted in a Classics Issue, 1985).

J. Bednar, "A theoretical comparison of equivalent-offset migration and dip moveout-prestack imaging" (1999) 64:1 Geophysics 191.

A. Canning & G. Gardner, "Two-Pass 3-D Prestack Depth Migration" (1993) 63rd Annual International Meeting of Expl. Geophys. 892.

J.R. Berryhill, "Kinematics of crossline prestack migration" (1991) 56:10 Geophysics 1674.

P.L. Stoffa et al., "Direct mapping of seismic data to the domain of intercept time and ray parameter—A plane-wave decomposition" (1981) 46:3 Geophysics 255.

J.W. Sattlegger et al., "Common Offset Plane Migration (COPMIG)" (1980) 28 Geophysical Prospecting 859.

O. Yilmaz, "Seismic Data Processing" in S.M. Doherty, ed., Investigations in Geophysics. vol. 2 (Tulsa: Society of Exploration Geophysicists, 1987) pp. 47-49, 155-183, 328-350, 403-410.

\* cited by examiner

METHOD, MEDIA, AND SIGNALS FOR PROCESSING SEISMIC DATA TO OBTAIN A VELOCITY FIELD

BACKGROUND OF THE INVENTION

1. Field of Invention

This invention relates to processing acoustic reflections to obtain velocity information for an acoustic medium and, in particular, processing seismic data to obtain a velocity field.

2. Description of Related Art

Acoustic energy in the form of reflected acoustic waves, such as conventional seismic reflections, are often detected and then processed to obtain a three-dimensional (3D) seismic velocity field associated with a 3D region within the earth's subsurface. The 3D velocity field typically includes velocity values approximating the velocity of a seismic wave travelling through corresponding points within the 3D region. The 3D velocity field may alternatively be expressed as a set of time-velocity curves. Each time-velocity curve is typically associated with a location on a surface of the 3D region and includes velocity values and associated time values. The time values represent the two-way travel time of sound along a path from a source, to a subsurface point and back to a receiver. The corresponding velocity value represents the velocity of sound travelling through the subsurface point.

Particular paths which have importance in seismic imaging include the "Normal Ray" path, which is the path followed by a Snell ray starting normal to a subsurface planar reflecting surface and travelling to the surface. Another important particular path is the "Image Ray" path, which is the path followed by a Snell ray starting normal to the surface and travelling downward to a subsurface point. Both rays obey Snell's Law as dictated by the acoustic wave equation (see O. Yilmaz, *Seismic Data Processing*, in S. M. Doherty, ed., Investigations in Geophysics No. 2 (Society of Exploration Geophysicists); S. M. Deregowski, "Common-Offset Migrations and Velocity Analysis", First Break, vol. 8, No. 6, June 1990, pp. 225–234; and P. Hubral, "Time Migration"—Some Theoretical Aspects", 1977, Geophysical Prospecting, pp. 738–745).

Producing seismic data conventionally includes detecting back scattered energy including seismic reflections and diffractions acquired from source-receiver pairs acting on a surface of the 3D region. Incident seismic waves are sequentially generated in the earth's subsurface by one or more sources of seismic energy and are each partially reflected or diffracted back from seismic scatterers, including for example strata interfaces, located at a distance from the surface equal to the depth of the seismic scatterer. Each seismic scatterer can be considered a reflection surface that may be parallel to the surface and referred to as a horizontal seismic reflector, or may be at an angle relative to the surface, known as a dipping angle. Each incident seismic wave, once reflected, is referred to as a seismic reflection. The seismic reflections generated from each sequentially acting seismic source reach different locations on the surface of the earth at different times, depending on the distance and velocity characteristics of the subsurface traversed. Each of one or more seismic receivers is used to produce a respective electrical signal representing the seismic reflections received at a location on the surface. Each electrical signal is often represented digitally as a time-amplitude representation that includes amplitude values associated with respective time values. The time-amplitude representation is referred to as a seismic trace. Each seismic trace is typically associated with the respective locations of the seismic source and receiver.

The seismic data may be divided into subsets conventionally referred to as common mid-point (CMP) gathers. Each CMP gather includes seismic traces associated with the same CMP location. The CMP location of a CMP gather is defined as the location mid-way between respective source and receiver locations of the source-receiver pairs that acted in producing the seismic traces making up the CMP gather. The seismic traces of each CMP gather are also associated with respective offset values. The offset value is the distance between the respective source and receiver locations of the source-receiver pair.

A normal moveout (NMO) operation may be performed on the seismic traces within a given CMP gather to time shift each amplitude value of each seismic trace of the given CMP gather according to the relation:

$$t^2(x)=t^2(0)+x^2/v^2$$

where t(x) is the time value associated with the amplitude value before the NMO operation;

t(0) is a zero-offset time value associated with the amplitude value after the NMO operation;

x is an offset value associated with the seismic trace; and v is a velocity value associated with a time value equal to t(0).

If an accurate time-velocity curve is used for an NMO operation applied to a CMP gather, then the resulting amplitude values produced from seismic reflections of the same seismic reflector will be associated with the same zero-offset time value and will be aligned at that zero-offset time after NMO. If, on the other hand, an inaccurate time-velocity curve is used for the NMO operation, the resulting amplitude values produced from seismic reflections of the same seismic reflector will not be aligned in time and the resulting CMP gather is said to have residual moveout. The extent to which the resulting amplitude values do not align in time indicates the extent of residual moveout.

Conventional velocity analysis includes manual and automatic velocity analysis. Conventional manual velocity analysis on each CMP gather may involve applying several NMO operations to the CMP gather, each NMO operation being performed using one time-velocity curve of a predetermined set of different time-velocity curves. The resulting CMP gathers are presented graphically to a velocity analysis expert who selects the resulting CMP gather for which the least amount of residual moveout is apparent from the graphical presentation. Manual velocity analysis requires the services of a velocity analysis expert, is time consuming, and often results in less than accurate estimates of velocity, especially when a limited number of different time-velocity curves is used.

Conventional automatic velocity analysis on each CMP gather may involve using an initial time-velocity curve to apply an NMO operation to the CMP gather to produce a resulting CMP gather, applying a stacking operation to the resulting CMP gather by summing the amplitude values of the respective time-amplitude traces of the resulting CMP gather to produce a stacked amplitude trace, modifying velocity values of the initial time-velocity curve, and iteratively producing stacked amplitude traces until a stacked amplitude trace having maximum stacked amplitudes is obtained. The time-velocity curve used to produce the stacked amplitude stack with maximum amplitudes is taken to be the most accurate time-velocity curve associated with the CMP. The process must be repeated for each CMP location on the surface to produce an optimal 3D velocity field. Such automatic velocity analysis requires an exorbitantly large number of iterations and is therefore computationally expensive.

Rather than optimizing an initial time-velocity curve for each CMP location, automatic velocity analysis may iteratively optimize an initial 3D velocity field. Such automatic velocity analysis may involve simultaneously maximizing stacked amplitude values of stacked amplitude traces associated with all CMP locations of interest. Such automatic velocity analysis, however, either risks instability, potentially converging to a local extremum or not converging at all, or requires a large number of iterations to stably converge to an optimal 3D velocity field.

SUMMARY

In accordance with one aspect of the invention, there is provided a method of estimating a seismic velocity field from seismic data comprising time-amplitude representations associated with source-receiver locations spaced apart by an offset distance and having a midpoint therebetween, the seismic data being arranged into common midpoint (CMP) gathers associated with respective CMP locations. The method involves defining a control plane having an edge intersecting a plurality of the CMP locations, producing an initial velocity field for the control plane, the initial velocity field comprising a plurality of time-velocity values for each of the CMP locations and producing an optimized velocity field for the control plane by adjusting the time-velocity values for each of the CMP locations in response to trends, relative to offset distance, in time values, associated with common seismic events, until the optimized velocity field satisfies a condition.

Producing the optimized velocity field may involve producing a set of gathers in response to the initial velocity field, according to a type of velocity field desired to be produced.

Producing the set of gathers may involve producing sets of common offset migration image gathers in response to the seismic data and the initial velocity field when an imaging velocity field is desired to be produced.

Producing the set of gathers may involve performing a normal moveout operation on the seismic data when the imaging velocity field is not desired to be produced.

The method may further involve producing an adjusted velocity field in response to the set of gathers and the initial velocity field.

Producing the adjusted velocity field may involve, for each CMP location and for each of the common seismic events, finding a slope of a curve approximating a trend, relative to offset, in the time values, associated with the common seismic event.

Finding the slope of the curve may involve producing slant stack values for a plurality of time(tau)-slope pairs.

The method may further involve, for each CMP location, producing for each time value of the time(tau)-slope pairs a best slope value in response to the time(tau)-slope pairs and the slant stack values.

The method may further involve, producing a temporary time-velocity representation in response to the initial velocity field and a plurality of the best slope values.

Producing the temporary time-velocity representation may involve adjusting each velocity value at a given time t of a corresponding time-velocity representation of the initial velocity field according to a relation:

$$V_{adj}(t) = \frac{1}{\sqrt{2\tau P_\tau + \frac{1}{V_{rep}^2}}}$$

where
$V_{adj}(t)$ is an adjusted velocity value associated with the given time t;
$\tau$ is a Tau value equal to the given time t;
$P_\tau$ is the best slope value at $\tau = t$; and
$V_{rep}$ is the velocity value at the given time t of the corresponding time-velocity representation.

The method may further involve conditioning the plurality of best slope values to produce conditioned best slope values and producing an adjusted time-velocity representation in response to the temporary time-velocity representation and the conditioned best slope values according to the relation.

The method may further involve determining whether the adjusted velocity field meets optimization criteria.

Determining whether the adjusted velocity field meets optimization criteria may involve determining whether velocity values of the adjusted velocity field are within a range of corresponding velocity values of a temporary initial velocity field.

The method may further involve producing a new adjusted velocity field using the adjusted velocity field as a new temporary initial velocity field when the optimization criteria are not met.

The method may further involve identifying the adjusted velocity field as the optimized velocity field for the control plane when the optimization criteria are met.

Producing the initial velocity field may involve producing a starting velocity field estimate.

Producing the starting velocity field estimate may involve defining a range of velocity values, defining one or more ranges of time values and associating each velocity value of the range of velocity values with one or more corresponding ranges of time values.

The method may further involve, for each of a plurality of CMP gathers, defining a window in which a selected CMP location associated with each CMP gather is centered.

The method may further involve producing a semblance panel associated with the selected CMP location, in response to the range of velocity values and selected CMP gathers associated with CMP locations within the window.

The method may further involve producing a time-velocity profile associated with the selected CMP location in response to the semblance panel and a set of velocity stacking weights.

The method may further involve producing smoothing weights for each velocity value of the range of velocity values and each time value of the one or more corresponding ranges of time values in response to respective products of total semblance and reciprocal velocity gradient associated with each time value and each velocity value.

The method may further involve producing a smooth time-velocity profile associated with the selected CMP location in response to the time-velocity profile and the smoothing weights.

The method may further involve producing laterally edited and laterally smoothed time-velocity profiles in response to a plurality of the smooth time-velocity profiles.

The method may further involve producing a migrated starting velocity field.

Producing the migrated starting velocity field may involve, for each CMP location, producing a normal moveout gather in response to the starting velocity field estimate and seismic data associated with each CMP location.

The method may further involve producing a CMP stack for each CMP location in response to a corresponding the normal moveout gather.

The method may further involve producing a simulated CMP gather for each CMP location in response to a corresponding the CMP stack and a corresponding time-velocity profile associated with each CMP location.

The method may further involve producing pre-stack imaged simulated gathers in response to a plurality of respective simulated CMP gathers and respective CMP locations.

The method may further involve producing normal moveout pre-stack imaged simulated gathers in response to the pre-stack imaged simulated gathers, the CMP locations and the starting velocity field estimate.

Producing the migrated velocity may involve producing the migrated velocity field in response to the normal moveout pre-stack imaged simulated gathers and the starting velocity field estimate.

Producing the migrated velocity field may involve, for each CMP location and for each of the common seismic events, finding a slope of a curve approximating a trend, relative to offset, in the time values, associated with the common seismic event.

Finding the slope of the curve may involve producing slant stack values for a plurality of time(tau)-slope pairs.

The method may further involve, for each CMP location, producing for each time value of the time(tau)-slope pairs a best slope value in response to the time(tau)-slope pairs and the slant stack values.

The method may further involve producing a first temporary time-velocity representation in response to the starting velocity field estimate and a plurality of the best slope values.

Producing the first temporary time-velocity representation may involve adjusting each velocity value at a given time t of a corresponding time-velocity representation of the starting velocity field estimate according to the relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau=t$; and $V_{rep}$ is the velocity value at the given time t of the corresponding time-velocity representation.

The method may further involve conditioning the plurality of best slope values to produce conditioned best slope values and producing an adjusted time-velocity representation in response to the temporary time-velocity representation and the conditioned best slope values according to the relation.

The method may further involve producing pre-stack imaged gathers by performing a 2-dimensional pre-stack imaging operation on seismic data associated with the control plane.

The method may further involve producing normal moveout gathers in response to the migrated starting velocity field by performing respective normal moveout operations on the pre-stack imaged gathers.

The method may further involve adjusting the migrated starting velocity field in response to the normal moveout gathers and the migrated starting velocity field.

Adjusting the migrated starting velocity field may involve, for each CMP location and for each of the common seismic events, finding a slope of a curve approximating a trend, relative to offset, in the time values, associated with the common seismic event.

Finding the slope of the curve may involve producing slant stack values for a plurality of time(tau)-slope pairs.

The method may further involve, for each CMP location, producing for each time value of the time(tau)-slope pairs a best slope value in response to the time(tau)-slope pairs and the slant stack values.

The method may further involve producing a second temporary time-velocity representation in response to the migrated starting velocity field and a plurality of the best slope values.

Producing the second temporary time-velocity representation may involve adjusting each velocity value at a given time t of a corresponding time-velocity representation of the migrated starting velocity field according to the relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau=t$; and $V_{rep}$ is the velocity value at the given time t of the corresponding time-velocity representation.

The method may further involve conditioning the plurality of best slope values to produce conditioned best slope values and adjusting the migrated starting velocity field in response to the temporary time-velocity representation and the conditioned best slope values according to the relation.

The method may further involve determining whether the seismic data is 2-dimensional data or 3-dimensional data, determining whether an imaging velocity is desired to be produced and performing a directional migration on the seismic data when the seismic data is 3-dimensional data and an imaging velocity is desired to be produced.

The method may further involve determining whether or not a dip moveout velocity or the imaging velocity is desired to be produced, and if so, performing a dip moveout operation on the seismic data.

Performing the dip moveout operation may involve performing a 2-dimensional dip moveout operation when the seismic data is 2-dimensional seismic data and performing a 3-dimensional dip moveout operation when the seismic data is 3-dimensional seismic data.

In accordance with another aspect of the invention, there is provided a method of estimating a seismic velocity field from seismic data including time-amplitude representations associated with source-receiver locations spaced apart by an offset distance and having a midpoint therebetween, the seismic data being arranged into common midpoint (CMP) gathers associated with respective CMP locations aligned along edges of respective planes in a 3-dimensional region in the earth. The method involves designating one of the respective planes as a control plane, estimating a velocity field for the control plane, using the method described above and producing an optimized velocity field for one of the respective planes nearby the control plane by adjusting time-velocity values for each of the CMP locations associated with the control plane, in response to trends, relative to offset, in time values, associated with common seismic events, in seismic data associated with the one of the planes nearby the control plane until the optimized velocity field satisfies a condition.

In accordance with another aspect of the invention, there is provided a method of estimating a seismic velocity field from seismic data including time-amplitude representations associated with source-receiver locations spaced apart by an offset distance and having a midpoint therebetween, the seismic data being arranged into common midpoint (CMP) gathers associated with respective CMP locations aligned along edges of respective planes in a 3-dimensional region in the earth. The method involves designating one of the respective planes as a control plane, estimating a velocity field for the control plane, using the method above and producing an optimized velocity field for each of the respective planes in the 3-dimensional region by adjusting time-velocity values for each of the CMP locations associated with the control plane, in response to trends, relative to offset, in time values, associated with common seismic events, relative to offset, in the seismic data associated with each of the respective planes until the optimized velocity field satisfies a condition.

In accordance with another aspect of the invention, there is provided a method of estimating a seismic velocity field from seismic data including time-amplitude representations associated with source-receiver locations spaced apart by an offset distance and having a midpoint therebetween, the seismic data being arranged into common midpoint (CMP) gathers associated with respective CMP locations aligned along edges of respective planes in a 3-dimensional region in the earth. The method involves designating one of the respective planes as a temporary control plane, estimating a velocity field for the temporary control plane, using the method above and producing an optimized velocity field for successive ones of the respective planes in the 3-dimensional region by, for a given plane in the 3-dimensional region, adjusting time-velocity values of a predecessor one of the respective planes, starting with the temporary control plane, in response to trends, relative to offset, in time values, associated with common seismic events and a common CMP, in seismic data associated with the given plane until the optimized velocity field satisfies a condition.

In accordance with another aspect of the invention, there is provided an apparatus for estimating a seismic velocity field from seismic data comprising time-amplitude representations associated with source-receiver locations spaced apart by an offset distance and having a midpoint therebetween, the seismic data being arranged into common midpoint (CMP) gathers associated with respective CMP locations. The apparatus includes a component configured to define a control plane having an edge intersecting a plurality of the CMP locations, a component configured to produce an initial velocity field for the control plane, the initial velocity field comprising a plurality of time-velocity values for each of the CMP locations and a component configured to produce an optimized velocity field for the control plane by adjusting the time-velocity values for each of the CMP locations in response to trends, relative to offset distance, in time values, associated with common seismic events, until the optimized velocity field satisfies a condition.

The component configured to produce the optimized velocity field may be configured to produce a set of gathers in response to the initial velocity field, according to a type of velocity field desired to be produced.

The component configured to produce the optimized velocity field may be configured to produce the set of gathers by producing sets of common offset migration image gathers in response to the seismic data and the initial velocity field when an imaging velocity field is desired to be produced.

The component configured to produce the set of gathers by performing a normal moveout operation on the seismic data when the imaging velocity field is not desired to be produced.

The apparatus may further include a component configured to produce an adjusted velocity field in response to the set of gathers and the initial velocity field.

The component configured to produce the adjusted velocity field may include, a processor circuit configured to: for each CMP location and for each of the common seismic events, find a slope of a curve approximating a trend, relative to offset, in the time values, associated with each common seismic event.

The processor circuit may be configured to find the slope of the curve by producing slant stack values for a plurality of time(tau)-slope pairs.

The processor circuit may be configured to, for each CMP location, produce for each time value of the time(tau)-slope pairs a best slope value in response to the time(tau)-slope pairs and the slant stack values.

The processor circuit may be configured to produce a temporary time-velocity representation in response to the initial velocity field and a plurality of the best slope values.

The processor circuit may be configured to produce the temporary time-velocity representation by adjusting each velocity value at a given time t of a corresponding time-velocity representation of the initial velocity field according to a relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau=t$; and $V_{rep}$ is each velocity value at the given time t of the corresponding time-velocity representation.

The processor circuit may be configured to condition the plurality of best slope values to produce conditioned best slope values and to produce an adjusted time-velocity representation in response to the temporary time-velocity representation and the conditioned best slope values according to the relation.

The apparatus may further include a processor circuit configured to determine whether the adjusted velocity field meets optimization criteria.

The processor circuit may be configured to determine whether the adjusted velocity field meets optimization criteria by determining whether velocity values of the adjusted velocity field are within a range of corresponding velocity values of a temporary initial velocity field.

The processor circuit may be configured to produce a new adjusted velocity field using the adjusted velocity field as a new temporary initial velocity field when the optimization criteria are not met.

The processor circuit may be configured to identify the adjusted velocity field as the optimized velocity field for the control plane when the optimization criteria are met.

The component configured to produce the initial velocity field may include a processor circuit configured to produce a starting velocity field estimate.

The processor circuit may be configured to produce the starting velocity field estimate by defining a range of velocity values, defining one or more ranges of time values and associating each velocity value of the range of velocity values with one or more corresponding ranges of time values.

The processor circuit may be configured to, for each of a plurality of CMP gathers, define a window in which a selected CMP location associated with each CMP gather is centered.

The processor circuit may be configured to produce a semblance panel associated with the selected CMP location, in response to the range of velocity values and selected CMP gathers associated with CMP locations within the window.

The processor circuit may be configured to produce a time-velocity profile associated with the selected CMP location in response to the semblance panel and a set of velocity stacking weights.

The processor circuit may be configured to produce smoothing weights for each velocity value of the range of velocity values and each time value of the one or more correspondence ranges of time values in response to respective products of total semblance and reciprocal velocity gradient associated with each time value and each velocity value.

The processor circuit may be configured to produce a smooth time-velocity profile associated with the selected CMP location in response to the time-velocity profile and the smoothing weights.

The processor circuit may be configured to produce laterally edited and laterally smoothed time-velocity profiles in response to a plurality of the smooth time-velocity profiles.

The processor circuit may be configured to produce a migrated starting velocity field.

The processor circuit may be configured to produce the migrated starting velocity field by, for each CMP location, producing a normal moveout gather in response to the starting velocity field estimate and seismic data associated with each CMP location.

The processor circuit may be configured to produce a CMP stack for each CMP location in response to a corresponding the normal moveout gather.

The processor circuit may be configured to produce a simulated CMP gather for each CMP location in response to a corresponding the CMP stack and a corresponding time-velocity profile associated with each CMP location.

The processor circuit may be configured to produce pre-stack imaged simulated gathers in response to a plurality of respective the simulated CMP gathers and respective the CMP locations.

The processor circuit may be configured to produce normal moveout pre-stack imaged simulated gathers in response to the pre-stack imaged simulated gathers, the CMP locations and the starting velocity field estimate.

The processor circuit may be configured to produce the migrated velocity by producing the migrated velocity field in response to the normal moveout pre-stack imaged simulated gathers and the starting velocity field estimate.

The processor circuit may be configured to produce the migrated velocity field by, for each CMP location and for each of the common seismic events, finding a slope of a curve approximating a trend, relative to offset, in the time values, associated with each common seismic event.

The processor circuit may be configured to find the slope of the curve by producing slant stack values for a plurality of time(tau)-slope pairs.

The processor circuit may be configured to, for each CMP location, produce for each time value of the time(tau)-slope pairs a best slope value in response to the time(tau)-slope pairs and the slant stack values.

The processor circuit may be configured to produce a first temporary time-velocity representation in response to the starting velocity field estimate and a plurality of the best slope values.

The processor circuit may be configured to produce the first temporary time-velocity representation by adjusting each velocity value at a given time t of a corresponding time-velocity representation of the starting velocity field estimate according to the relation:

$$V_{adj}(t) = \frac{1}{\sqrt{2\tau P_\tau + \frac{1}{V_{rep}^2}}}$$

where
$V_{adj}(t)$ is an adjusted velocity value associated with the given time t;
$\tau$ is a Tau value equal to the given time t;
$P_\tau$ is the best slope value at $\tau=t$; and
$V_{rep}$ is each velocity value at the given time t of the corresponding time-velocity representation.

The processor circuit may be configured to condition the plurality of best slope values to produce conditioned best slope values and to produce an adjusted time-velocity representation in response to the temporary time-velocity representation and the conditioned best slope values according to the relation.

The processor circuit may be configured to produce pre-stack imaged gathers by performing a 2-dimensional pre-stack imaging operation on seismic data associated with the control plane.

The processor circuit may be configured to produce normal moveout gathers in response to the migrated starting velocity field by performing respective normal moveout operations on the pre-stack imaged gathers.

The processor circuit may be configured to adjust the migrated starting velocity field in response to the normal moveout gathers and the migrated starting velocity field.

The processor circuit may be configured to adjust the migrated starting velocity field by, for each CMP location and for each of the common seismic events, finding a slope of a curve approximating a trend, relative to offset, in the time values, associated with each common seismic event.

The processor circuit may be configured to find the slope of the curve by producing slant stack values for a plurality of time(tau)-slope pairs.

The processor circuit may be configured to, for each CMP location, produce for each time value of the time(tau)-slope pairs a best slope value in response to the time(tau)-slope pairs and the slant stack values.

The processor circuit may be configured to produce a second temporary time-velocity representation in response to the migrated starting velocity field and a plurality of the best slope values.

The processor circuit may be configured to produce the second temporary time-velocity representation by adjusting each velocity value at a given time t of a corresponding time-velocity representation of the migrated starting velocity field according to the relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau=t$; and $V_{rep}$ is each velocity value at the given time t of the corresponding time-velocity representation.

The processor circuit may be configured to condition the plurality of best slope values to produce conditioned best slope values and adjust the migrated starting velocity field in response to the temporary time-velocity representation and the conditioned best slope values according to the relation.

The apparatus may further include a processor circuit configured to determine whether the seismic data is 2-dimensional data or 3-dimensional data, determine whether an imaging velocity is desired to be produced, and perform a directional migration on the seismic data when the seismic data is 3-dimensional data and an imaging velocity is desired to be produced.

The processor circuit may be configured to determine whether or not a dip moveout velocity or the imaging velocity is desired to be produced, and if so, perform a dip moveout operation on the seismic data.

The processor circuit may be configured to perform the dip moveout operation by performing a 2-dimensional dip moveout operation when the seismic data is the 2-dimensional seismic data and perform a 3-dimensional dip moveout operation when the seismic data is 3-dimensional data.

In accordance with another aspect of the invention, there is provided an apparatus for estimating a seismic velocity field from seismic data comprising time-amplitude representations associated with source-receiver locations spaced apart by an offset distance and having a midpoint therebetween, the seismic data being arranged into common midpoint (CMP) gathers associated with respective CMP locations aligned along edges of respective planes in a 3-dimensional region in the earth. The apparatus includes a component configured to designate one of the respective planes as a control plane, the apparatus described above, for estimating a velocity field for the control plane and a component configured to produce an optimized velocity field for one of the respective planes nearby the control plane by adjusting time-velocity values for each of the CMP locations associated with the control plane, in response to trends, relative to offset, in time values, associated with common seismic events, in seismic data associated with the one of the planes nearby the control plane until the optimized velocity field satisfies a condition.

In accordance with another aspect of the invention, there is provided an apparatus for estimating a seismic velocity field from seismic data comprising time-amplitude representations associated with source-receiver locations spaced apart by an offset distance and having a midpoint therebetween, the seismic data being arranged into common midpoint (CMP) gathers associated with respective CMP locations aligned along edges of respective planes in a 3-dimensional region in the earth. The apparatus includes a component configured to designate one of the respective planes as a control plane, the apparatus described above, for estimating a velocity field for the control plane and a component configured to produce an optimized velocity field for each of the respective planes in the 3-dimensional region by adjusting time-velocity values for each of the CMP locations associated with the control plane, in response to trends, relative to offset, in time values, associated with common seismic events, relative to offset, in the seismic data associated with each of the respective planes until the optimized velocity field satisfies a condition.

In accordance with another aspect of the invention, there is provided an apparatus for estimating a seismic velocity field from seismic data comprising time-amplitude representations associated with source-receiver locations spaced apart by an offset distance and having a midpoint therebetween, the seismic data being arranged into common midpoint (CMP) gathers associated with respective CMP locations aligned along edges of respective planes in a 3-dimensional region in the earth. The apparatus includes a component configured to designate one of the respective planes as a temporary control plane, the apparatus described above, for estimating a velocity field for the temporary control plane and a component configured to produce an optimized velocity field for successive ones of the respective planes in the 3-dimensional region by, for a given plane in the 3-dimensional region, adjusting time-velocity values of a predecessor one of the respective planes, starting with the temporary control plane, in response to trends, relative to offset, in time values, associated with common seismic events and a common CMP, in seismic data associated with the given plane until the optimized velocity field satisfies a condition.

In accordance with another aspect of the invention, there is provided a method of producing an initial velocity field estimate for a control plane from seismic data associated with the control plane including time-amplitude representations associated with source-receiver locations spaced apart by an offset distance and having a midpoint therebetween, the seismic data being arranged into common midpoint (CMP) gathers associated with respective CMP locations and the control plane having an edge intersecting a plurality of the CMP locations. The method involves producing a starting velocity field estimate from an initial range of velocity values and an initial range of time values, producing a migrated starting velocity field from the starting velocity field estimate and the seismic data, producing pre-stack imaged gathers by performing a 2-dimensional pre-stack imaging process on the seismic data, producing normal moveout gathers in response to the migrated starting velocity field, performing a normal moveout operation on the pre-stack imaged gathers and adjusting the migrated starting velocity field in response to the normal moveout gathers and the migrated starting velocity field to produce a plurality of time-velocity values for each of the CMP locations, the plurality of the time-velocity values acting as the initial velocity field.

Producing the starting velocity field estimate may involve defining a range of velocity values, defining one or more ranges of time values and associating each velocity value of the range of velocity values with one or more corresponding ranges of time values.

The method may further involve, for each of a plurality of CMP gathers, defining a window in which a selected CMP location associated with each CMP gather is centered.

The method may further involve producing a semblance panel associated with the selected CMP location, in response to the range of velocity values and selected CMP gathers associated with CMP locations within the window.

The method may further involve producing a time-velocity profile associated with the selected CMP location in response to the semblance panel and a set of velocity stacking weights.

The method may further involve producing smoothing weights for each velocity value of the range of velocity values and each time value of the one or more corresponding ranges of time values in response to respective products of total semblance and reciprocal velocity gradient associated with each time value and each velocity value.

The method may further involve producing a smooth time-velocity profile associated with the selected CMP location in response to the time-velocity profile and the smoothing weights.

The method may further involve producing laterally edited and laterally smoothed time-velocity profiles in response to a plurality of the smooth time-velocity profiles.

Producing the migrated starting velocity field may involve, for each of the CMP locations, producing a normal moveout gather in response to the starting velocity field estimate and seismic data associated with each CMP location.

The method may further involve producing a CMP stack for each CMP location in response to a corresponding normal moveout gather.

The method may further involve producing a simulated CMP gather for each CMP location in response to a corresponding CMP stack and a corresponding time-velocity profile associated with each CMP location.

The method may further involve producing pre-stack imaged simulated gathers in response to a plurality of respective simulated CMP gathers and respective CMP locations.

The method may further involve producing normal moveout pre-stack imaged simulated gathers in response to the pre-stack imaged simulated gathers, the CMP locations and the starting velocity field estimate.

Producing the migrated velocity field may involve producing the migrated velocity field in response to the normal moveout pre-stack imaged simulated gathers and the starting velocity field estimate.

Producing the migrated velocity field may involve, for each CMP location and for each of the common seismic events, finding a slope of a curve approximating a trend, relative to offset, in the time values, associated with the common seismic event.

Finding the slope of the curve may involve producing slant stack values for a plurality of time(tau)-slope pairs.

The method may further involve, for each CMP location, producing for each time value of the time(tau)-slope pairs a best slope value in response to the time(tau)-slope pairs and the slant stack values.

The method may further involve producing a first temporary time-velocity representation in response to the starting velocity field estimate and a plurality of the best slope values.

Producing the first temporary time-velocity representation may involve adjusting each velocity value at a given time t of a corresponding time-velocity representation of the starting velocity field estimate according to the relation:

$$V_{adj}(t) = \frac{1}{\sqrt{2\tau P_\tau + \frac{1}{V_{rep}^2}}}$$

where
$V_{adj}(t)$ is an adjusted velocity value associated with the given time t;
$\tau$ is a Tau value equal to the given time t;
$P_\tau$ is the best slope value at $\tau$=t; and
$V_{rep}$ is the velocity value at the given time t of the corresponding time-velocity representation.

The method may further involve conditioning the plurality of best slope values to produce conditioned best slope values and producing an adjusted time-velocity representation in response to the temporary time-velocity representation and the conditioned best slope values according to the relation.

Adjusting the migrated starting velocity field may involve, for each of the CMP locations and for each of the common seismic events, finding a slope of a curve approximating the trend, relative to offset, in the time values, associated with the common seismic event.

Finding the slope of the curve may involve producing slant stack values for a plurality of time(tau)-slope pairs.

The method may further involve, for each CMP location, producing for each time value of the time(tau)-slope pairs a best slope value in response to the time(tau)-slope pairs and the slant stack values.

The method may further involve producing a second temporary time-velocity representation in response to the migrated starting velocity field and a plurality of the best slope values.

Producing the second temporary time-velocity representation may involve adjusting each velocity value at a given time t of a corresponding time-velocity representation of the migrated starting velocity field according to a relation:

$$V_{adj}(t) = \frac{1}{\sqrt{2\tau P_\tau + \frac{1}{V_{rep}^2}}}$$

where
$V_{adj}(t)$ is an adjusted velocity value associated with the given time t;
$\tau$ is a Tau value equal to the given time t;
$P_\tau$ is the best slope value at r t; and $V_{rep}$ is the velocity value at the given time t of the corresponding time-velocity representation.

The method may further involve conditioning the plurality of best slope values to produce conditioned best slope values and adjusting the migrated starting velocity field in response to the temporary time-velocity representation and the conditioned best slope values according to the relation.

In accordance with another aspect of the invention, there is provided an apparatus for producing an initial velocity field estimate for a control plane from seismic data associated with the control plane and comprising time-amplitude representations associated with source-receiver locations spaced apart by an offset distance and having a midpoint therebetween, the seismic data being arranged into common midpoint (CMP) gathers associated with respective CMP locations and the control plane having an edge intersecting a plurality of the CMP locations. The apparatus may further include a component configured to produce a starting velocity field estimate from an initial range of velocity values and an initial range of time values, a component configured to produce a migrated starting velocity field from the starting velocity field estimate and the seismic data, a component configured to produce pre-stack imaged gathers by performing a 2-dimensional pre-stack imaging process on the seismic data, a component configured to produce normal moveout gathers in response to the migrated starting velocity field, including performing a normal moveout operation on the pre-stack imaged gathers and a component configured to adjust the migrated starting velocity field in response to the normal moveout gathers and the migrated starting velocity field to produce a plurality of time-velocity values for each of the CMP locations, the plurality of the time-velocity values acting as the initial velocity field.

The component configured to produce the starting velocity field estimate may include a processor circuit configured to define a range of velocity values, define one or more ranges of time values and associate each velocity value of the range of velocity values with one or more corresponding ranges of time values.

The processor circuit may be configured to, for each of a plurality of CMP gathers, define a window in which a selected CMP location associated with each CMP gather is centered.

The processor circuit may be configured to produce a semblance panel associated with the selected CMP location, in response to the range of velocity values and selected CMP gathers associated with CMP locations within the window.

The processor circuit may be configured to produce a time-velocity profile associated with the selected CMP location in response to the semblance panel and a set of velocity stacking weights.

The processor circuit may be configured to produce smoothing weights for each velocity value of the range of velocity values and each time value of the one or more corresponding ranges of time values in response to respective products of total semblance and reciprocal velocity gradient associated with each time value and each velocity value.

The processor circuit may be configured to produce a smooth time-velocity profile associated with the selected CMP location in response to the time-velocity profile and the smoothing weights.

The processor circuit may be configured to produce laterally edited and laterally smoothed time-velocity profiles in response to a plurality of the smooth time-velocity profiles.

The component may be configured to produce the migrated starting velocity field may include the processor and wherein the processor may be configured to, for each of the CMP locations, produce a normal moveout gather in response to the starting velocity field estimate and seismic data associated with each CMP location.

The processor circuit may be configured to produce a CMP stack for each CMP location in response to a corresponding the normal moveout gather.

The processor circuit may be configured to produce a simulated CMP gather for each CMP location in response to a corresponding the CMP stack and a corresponding time-velocity profile associated with each CMP location.

The processor circuit may be configured to produce pre-stack imaged simulated gathers in response to a plurality of respective the simulated CMP gathers and respective the CMP locations.

The processor circuit may be configured to produce normal moveout pre-stack imaged simulated gathers in response to the pre-stack imaged simulated gathers, the CMP locations and the starting velocity field estimate.

The processor circuit may be configured to produce the migrated velocity field by producing the migrated velocity field in response to the normal moveout pre-stack imaged simulated gathers and the starting velocity field estimate.

The processor circuit may be configured to produce the migrated velocity field by, for each CMP location and for each of the common seismic events, finding a slope of a curve approximating a trend, relative to offset, in the time values, associated with each common seismic event.

The processor circuit may be configured to find the slope of the curve by producing slant stack values for a plurality of time(tau)-slope pairs.

The processor circuit may be configured to, for each CMP location, produce for each time value of the time(tau)-slope pairs a best slope value in response to the time(tau)-slope pairs and the slant stack values.

The processor circuit may be configured to produce a first temporary time-velocity representation in response to the starting velocity field estimate and a plurality of the best slope values.

The processor circuit may be configured to produce the first temporary time-velocity representation by adjusting each velocity value at a given time t of a corresponding time-velocity representation of the starting velocity field estimate according to the relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau = t$; and $V_{rep}$ is each velocity value at the given time t of the corresponding time-velocity representation.

The processor circuit may be configured to condition the plurality of best slope values to produce conditioned best slope values and produce an adjusted time-velocity representation in response to the temporary time-velocity representation and the conditioned best slope values according to the relation.

The component configured to adjust the migrated starting velocity field may include the processor circuit configured to, for each of the CMP locations and for each of the common seismic events, find a slope of a curve approximating the trend, relative to offset, in the time values, associated with each common seismic event.

The processor circuit may be configured to find the slope of the curve by producing slant stack values for a plurality of time(tau)-slope pairs.

The processor circuit may be configured to, for each CMP location, produce for each time value of the time(tau)-slope pairs a best slope value in response to the time(tau)-slope pairs and the slant stack values.

The processor circuit may be configured to produce a second temporary time-velocity representation in response to the migrated starting velocity field and a plurality of the best slope values.

The processor circuit may be configured to produce the second temporary time-velocity representation by adjusting each velocity value at a given time t of a corresponding time-velocity representation of the migrated starting velocity field according to a relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau = t$; and $V_{rep}$ is each velocity value at the given time t of the corresponding time-velocity representation.

The processor circuit may be configured to condition the plurality of best slope values to produce conditioned best slope values and adjust the migrated starting velocity field in response to the temporary time-velocity representation and the conditioned best slope values according to the relation.

In accordance with another aspect of the invention, there is provided a method of producing a starting velocity field estimate from seismic data including time-amplitude representations associated with source-receiver locations spaced apart by an offset distance and having a midpoint therebetween, the seismic data being arranged into common midpoint (CMP) gathers associated with respective CMP locations. The method involves defining a range of velocity values, defining one or more ranges of time values and associating each velocity value of the range of velocity values with one or more corresponding ranges of time values and for each of a plurality of CMP gathers defining a window in which a selected CMP location associated with each CMP gather is centered, producing a semblance panel associated with the selected CMP location, in response to the range of velocity values and selected CMP gathers associated with CMP locations within the window. The method further involves producing a time-velocity profile associated with the selected CMP location in response to the semblance panel and a set of velocity stacking weights, producing smoothing weights for each velocity value of the range of velocity values and each time value of the one or more ranges of time values in response to respective products of total semblance and reciprocal velocity gradient associated with each time value and each velocity value and producing a smooth time-velocity profile associated with the selected CMP location in response to the time-velocity profile and the smoothing weights.

The method may further involve producing laterally edited and laterally smoothed time-velocity profiles in response to a plurality of the smooth time-velocity profiles.

The method may further involve selecting CMP gathers of the seismic data that meet selection criteria based on CMP fold and offset distribution, for use in defining the window.

In accordance with one aspect of the invention, there is provided an apparatus for producing a starting velocity field estimate from seismic data comprising time-amplitude representations associated with source-receiver locations spaced apart by an offset distance and having a midpoint therebetween, the seismic data being arranged into common midpoint (CMP) gathers associated with respective CMP locations. The apparatus may include a component configured to define a range of velocity values, define one or more ranges of time values and associate each velocity value of the range of velocity values with one or more corresponding ranges of time values and a component configured to for each of a plurality of CMP gathers which may define a window in which a selected CMP location associated with each CMP gather is centered, which may produce a semblance panel associated with the selected CMP location, in response to the range of velocity values and selected CMP gathers associated with CMP locations within the window, which may produce a time-velocity profile associated with the selected CMP location in response to the semblance panel and a set of velocity stacking weights, which may produce smoothing weights for each velocity value of the range of velocity values and each time value of the one or more ranges of time values in response to respective products of total semblance and reciprocal velocity gradient associated with each time value and each velocity value and which may produce a smooth time-velocity profile associated with the selected CMP location in response to the time-velocity profile and the smoothing weights.

The apparatus may further include a component configured to produce laterally edited and laterally smoothed time-velocity profiles in response to a plurality of the smooth time-velocity profiles.

The component configured to define a window may be configured to select CMP gathers of the seismic data that meet selection criteria based on CMP fold and offset distribution, for use in defining the window.

In accordance with another aspect of the invention, there is provided a method of producing a migrated velocity field in response to seismic data including time-amplitude representations associated with source-receiver locations spaced apart by an offset distance and having a midpoint therebetween, the seismic data being arranged into common midpoint (CMP) gathers associated with respective CMP locations and a starting velocity field estimate comprising time-velocity profiles associated with respective CMP locations. The method involves for each of the CMP locations, producing a normal moveout gather in response to the starting velocity field estimate and the seismic data associated with each CMP location producing a CMP stack in response to a corresponding the normal moveout gather, producing a simulated CMP gather in response to a corresponding CMP stack and a corresponding time-velocity profile, producing pre-stack imaged simulated gathers in response to a plurality of respective simulated CMP gathers and respective CMP locations, producing normal moveout pre-stack imaged simulated gathers in response to the pre-stack imaged simulated gathers, the CMP locations and the starting velocity field estimate and producing the migrated velocity field in response to the normal moveout pre-stack imaged simulated gathers and the starting velocity field estimate.

Producing the migrated velocity field may involve, for each CMP location and for each of a plurality of common seismic events, finding a slope of a curve approximating a trend, relative to offset, in time values, associated with the common seismic event.

Finding the slope of the curve may involve producing slant stack values for a plurality of time(tau)-slope pairs.

The method may further involve, for each CMP location, producing for each time value of the time(tau)-slope pairs a best slope value in response to the time(tau)-slope pairs and the slant stack values.

The method may further involve producing a temporary time-velocity representation in response to the starting velocity field estimate and a plurality of the best slope values.

Producing the temporary time-velocity representation may involve adjusting each velocity value at a given time t of a corresponding time-velocity representation of the starting velocity field estimate according to a relation:

$$V_{adj}(t) = \frac{1}{\sqrt{2\tau P_\tau + \frac{1}{V_{rep}^2}}}$$

where
$V_{adj}(t)$ is an adjusted velocity value associated with the given time t;
$\tau$ is a Tau value equal to the given time t;
$P_\tau$ is the best slope value at $\tau = t$; and
$V_{rep}$ is the velocity value at the given time t of the corresponding time-velocity representation.

The method may further involve conditioning the plurality of best slope values to produce conditioned best slope values and producing an adjusted time-velocity representation in response to the temporary time-velocity representation and the conditioned best slope values according to the relation.

In accordance with another aspect of the invention, there is provided an apparatus for producing a migrated velocity field in response to seismic data comprising time-amplitude representations associated with source-receiver locations spaced apart by an offset distance and having a midpoint therebetween, the seismic data being arranged into common midpoint (CMP) gathers associated with respective CMP locations and a starting velocity field estimate comprising time-velocity profiles associated with respective the CMP locations. The apparatus may include a component configured to, for each of the CMP locations, produce a normal moveout gather in response to the starting velocity field estimate and the seismic data associated with each CMP location which may produce a CMP stack in response to a corresponding the normal moveout gather and may produce a simulated CMP gather in response to a corresponding the CMP stack and a corresponding time-velocity profile, a component configured to produce pre-stack imaged simulated gathers in response to a plurality of respective the simulated CMP gathers and respective the CMP locations, a component configured to produce normal moveout pre-stack imaged simulated gathers in response to the pre-stack imaged simulated gathers, the CMP locations and the starting velocity field estimate and a component configured to produce the migrated velocity field in response to the normal moveout pre-stack imaged simulated gathers and the starting velocity field estimate.

The component configured to produce the migrated velocity field may include a processor circuit configured to, for each CMP location and for each of a plurality of common seismic events, find a slope of a curve approximating a trend, relative to offset, in time values, associated with each common seismic event.

The processor circuit may be configured to find the slope of the curve by producing slant stack values for a plurality of time(tau)-slope pairs.

The processor circuit may be configured to, for each CMP location, produce for each time value of the time(tau)-slope pairs a best slope value in response to the time(tau)-slope pairs and the slant stack values.

The processor circuit may be configured to produce a temporary time-velocity representation in response to the starting velocity field estimate and a plurality of the best slope values.

The processor circuit may be configured to produce the temporary time-velocity representation by adjusting each velocity value at a given time t of a corresponding time-velocity representation of the starting velocity field estimate according to a relation:

$$V_{adj}(t) = \frac{1}{\sqrt{2\tau P_\tau + \frac{1}{V_{rep}^2}}}$$

where
$V_{adj}(t)$ is an adjusted velocity value associated with the given time t;
$\tau$ is a Tau value equal to the given time t;
$P_\tau$ is the best slope value at $\tau = t$; and
$V_{rep}$ is each velocity value at the given time t of the corresponding time-velocity representation.

The processor circuit may be configured to condition the plurality of best slope values to produce conditioned best slope values and produce an adjusted time-velocity representation in response to the temporary time-velocity representation and the conditioned best slope values according to the relation.

In accordance with another aspect of the invention, there is provided a method of producing an output velocity field in response to an input velocity field and seismic data including time-amplitude representations associated with source-receiver locations spaced apart by an offset distance and having a midpoint therebetween, the seismic data being arranged into common midpoint (CMP) gathers associated with respective CMP locations. The method involves, for each of the CMP locations, and for each of a plurality of common seismic events, finding a slope of a curve approximating a trend, relative to offset, in time values, associated with the common seismic event, by producing slant stack values for a plurality of time(tau)-slope pairs, producing for each time value of the time(tau)-slope pairs a best slope value in response to the time(tau)-slope pairs and the slant stack values, producing a temporary time-velocity representation in response to the input velocity field and a plurality of the best slope values and conditioning the plurality of best slope values to produce conditioned best slope values and producing an adjusted time-velocity representation in response to the temporary time-velocity representation and the conditioned best slope values.

Producing the temporary time-velocity representation may involve adjusting each velocity value at a given time t of a corresponding time-velocity representation of the input velocity field according to a relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau=t$; and $V_{rep}$ is the velocity value at the given time t of the corresponding time-velocity representation.

Producing the slant stack values may involve storing the slant stack values in a buffer as the slant stack values are produced.

Producing the slant stack values may involve producing the slant stack values until the buffer reaches a fill level.

The method may further involve producing edited and smoothed tau-slope values for each CMP location.

Producing edited and smoothed tau-slope values may involve performing a weighted lateral median filtering on the time(tau)-slope pairs.

The method may further involve producing a weight value for each velocity value of the temporary time-velocity representation.

The method may further involve producing a best slope reliability value for each of the plurality of best slope values.

The method may further involve producing the conditioned best slope values in response to the best slope values, the best slope reliability values and the weight values.

Producing the adjusted time-velocity representation may involve producing the adjusted time-velocity representation in response to the temporary time-velocity representation and the conditioned best slope values according to the relation, using the temporary time velocity representation as the corresponding time-velocity representation.

In accordance with another aspect of the invention, there is provided an apparatus for producing an output velocity field in response to an input velocity field and seismic data comprising time-amplitude representations associated with source-receiver locations spaced apart by an offset distance and having a midpoint therebetween, the seismic data being arranged into common midpoint (CMP) gathers associated with respective CMP locations. The apparatus may include a processor circuit configured to, for each of the CMP locations and for each of a plurality of common seismic events, find a slope of a curve approximating a trend, relative to offset, in time values, associated with each common seismic event, by producing slant stack values for a plurality of time(tau)-slope pairs, produce for each time value of the time(tau)-slope pairs a best slope value in response to the time(tau)-slope pairs and the slant stack values, produce a temporary time-velocity representation in response to the input velocity field and a plurality of the best slope values and condition the plurality of best slope values to produce conditioned best slope values and produce an adjusted time-velocity representation in response to the temporary time-velocity representation and the conditioned best slope values.

The processor circuit may be configured to produce the temporary time-velocity representation by adjusting each velocity value at a given time t of a corresponding time-velocity representation of the input velocity field according to a relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau=t$; and $V_{rep}$ is each velocity value at the given time t of the corresponding time-velocity representation.

The processor circuit may be configured to produce the slant stack values by storing the slant stack values in a buffer as the slant stack values are produced.

The processor circuit may be configured to produce the slant stack values by producing the slant stack values until the buffer reaches a fill level.

The processor circuit may be configured to produce edited and smoothed tau-slope values for each CMP location.

The processor circuit may be configured to produce edited and smoothed tau-slope values by performing a weighted lateral median filtering on the time(tau)-slope pairs.

The processor circuit may be configured to produce a weight value for each velocity value of the temporary time-velocity representation.

The processor circuit may be configured to produce a best slope reliability value for each of the plurality of best slope values.

The processor circuit may be configured to produce the conditioned best slope values in response to the best slope values, the best slope reliability values and the weight values.

The processor circuit may be configured to produce the adjusted time-velocity representation by producing the adjusted time-velocity representation in response to the temporary time-velocity representation and the conditioned best slope values according to the relation, and use the temporary time velocity representation as the corresponding time-velocity representation.

In accordance with another aspect of the invention, there is provided a method of producing an optimized velocity field in response to an initial velocity field and seismic data comprising time-amplitude representations associated with source-receiver locations spaced apart by an offset distance and having a midpoint therebetween, the seismic data being arranged into common midpoint (CMP) gathers associated with respective CMP locations. The method involves defining a temporary initial velocity field associated with the seismic data, producing a set of gathers in response to the temporary initial velocity field, according to a type of velocity field desired to be produced, producing an adjusted velocity field in response to the set of gathers and the temporary initial velocity field and outputting the adjusted velocity field when the adjusted velocity field meets optimization criteria.

The method may further involve producing a new adjusted velocity field using the adjusted velocity field as a new temporary initial velocity field when the optimization criteria are not met.

The method may further involve identifying the adjusted velocity field as the optimized velocity field when the optimization criteria are met.

Producing the set of gathers may involve producing sets of common offset migration image gathers in response to the seismic data and the initial velocity field when an imaging velocity field is desired to be produced.

Producing the set of gathers may involve performing a normal moveout operation on the seismic data when the imaging velocity field is not desired to be produced.

Outputting the adjusted velocity field when the adjusted velocity field meets optimization criteria may involve determining whether velocity values of the adjusted velocity field are within a range of corresponding velocity values of the temporary initial velocity field.

Producing the adjusted velocity field may involve, for each of the CMP locations and for each of a plurality of common seismic events, finding a slope of a curve approximating a trend, relative to offset, in time values, associated with the common seismic event.

Finding the slope of the curve may involve producing slant stack values for a plurality of time(tau)-slope pairs.

The method may further involve, for each CMP location, producing for each time value of the time(tau)-slope pairs a best slope value in response to the time(tau)-slope pairs and the slant stack values.

The method may further involve producing a temporary time-velocity representation in response to the initial velocity field and a plurality of the best slope values.

Producing the temporary time-velocity representation may involve adjusting each velocity value at a given time t of a corresponding time-velocity representation of the initial velocity field according to a relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau=t$; and $V_{rep}$ is the velocity value at the given time t of the corresponding time-velocity representation.

The method may further involve conditioning the plurality of best slope values to produce conditioned best slope values and producing an adjusted time-velocity representation in response to the temporary time-velocity representation and the conditioned best slope values according to the relation.

Producing slant stack values may involve storing the slant stack values in a buffer as the slant stack values are produced.

Producing the slant stack values may involve producing the slant stack values until the buffer reaches a fill level.

The method may further involve producing edited and smoothed tau-slope values for each CMP location.

Producing edited and smoothed tau-slope values may involve performing a weighted lateral median filtering on the time(tau)-slope pairs.

The method may further involve producing a weight value for each velocity value of the temporary time-velocity representation.

The method may further involve producing a best slope reliability value for each of the plurality of best slope values.

The method may further involve producing the conditioned best slope values in response to the plurality of best slope values, a plurality of the best slope reliability values and a plurality of the weight values.

In accordance with another aspect of the invention, there is provided an apparatus for producing an optimized velocity field in response to an initial velocity field and seismic data comprising time-amplitude representations associated with source-receiver locations spaced apart by an offset distance and having a midpoint therebetween, the seismic data being arranged into common midpoint (CMP) gathers associated with respective CMP locations. The apparatus may include a component configured to define a temporary initial velocity field associated with the seismic data, a component configured to produce a set of gathers in response to the temporary initial velocity field, according to a type of velocity field desired to be produced, a component configured to produce an adjusted velocity field in response to the set of gathers and the temporary initial velocity field and a component configured to output the adjusted velocity field when the adjusted velocity field meets optimization criteria.

The component configured to produce an adjusted velocity field may be configured to produce a new adjusted velocity field using the adjusted velocity field as a new temporary initial velocity field when the optimization criteria are not met.

The component configured to output the adjusted velocity field may be configured to identify the adjusted velocity field as the optimized velocity field when the optimization criteria are met.

The component configured to produce the set of gathers may be configured to produce sets of common offset migration image gathers in response to the seismic data and the initial velocity field when an imaging velocity field is desired to be produced.

The component configured to produce the set of gathers may be configured to perform a normal moveout operation on the seismic data when the imaging velocity field is not desired to be produced.

The component configured to output the adjusted velocity field when the adjusted velocity field meets optimization criteria may be configured to determine whether velocity values of the adjusted velocity field are within a range of corresponding velocity values of the temporary initial velocity field.

The component configured to produce the adjusted velocity field includes a processor circuit configured to, for each of the CMP locations and for each of a plurality of common seismic events, find a slope of a curve approximating a trend, relative to offset, in time values, associated with each common seismic event.

The processor circuit may be configured to find the slope of the curve by producing slant stack values for a plurality of time(tau)-slope pairs.

The processor circuit may be configured to, for each CMP location, produce for each time value of the time(tau)-slope pairs a best slope value in response to the time(tau)-slope pairs and the slant stack values.

The processor circuit may be configured to produce a temporary time-velocity representation in response to the initial velocity field and a plurality of the best slope values.

The processor circuit may be configured to produce the temporary time-velocity representation by adjusting each velocity value at a given time t of a corresponding time-velocity representation of the initial velocity field according to a relation:

$$V_{adj}(t) = \frac{1}{\sqrt{2\tau P_\tau + \frac{1}{V_{rep}^2}}}$$

where $V_{adj}(t)$ is an adjusted velocity value associated with the given time t;

$\tau$ is a Tau value equal to the given time t;

$P_\tau$ is the best slope value at $\tau = t$; and $V_{rep}$ is each velocity value at the given time t of the corresponding time-velocity representation.

The processor circuit may be configured to condition the plurality of best slope values to produce conditioned best slope values and to produce an adjusted time-velocity representation in response to the temporary time-velocity representation and the conditioned best slope values according to the relation.

The processor circuit may be configured to produce slant stack values by storing the slant stack values in a buffer as the slant stack values are produced.

The processor circuit may be configured to produce the slant stack values by producing the slant stack values until the buffer reaches a fill level.

The processor circuit may be configured to produce edited and smoothed tau-slope values for each CMP location.

The processor circuit may be configured to produce edited and smoothed tau-slope values by performing a weighted lateral median filtering on the time(tau)-slope pairs.

The processor circuit may be configured to produce a weight value for each velocity value of the temporary time-velocity representation.

The processor circuit may be configured to produce a best slope reliability value for each of the plurality of best slope values.

The processor circuit may be configured to produce the conditioned best slope values in response to the plurality of best slope values, a plurality of the best slope reliability values and a plurality of the weight values.

In accordance with another aspect of the invention, there is provided a computer readable medium encoded with codes for directing a processor circuit to carry out any of the methods above and/or any variations thereof. The medium may include a computer readable signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
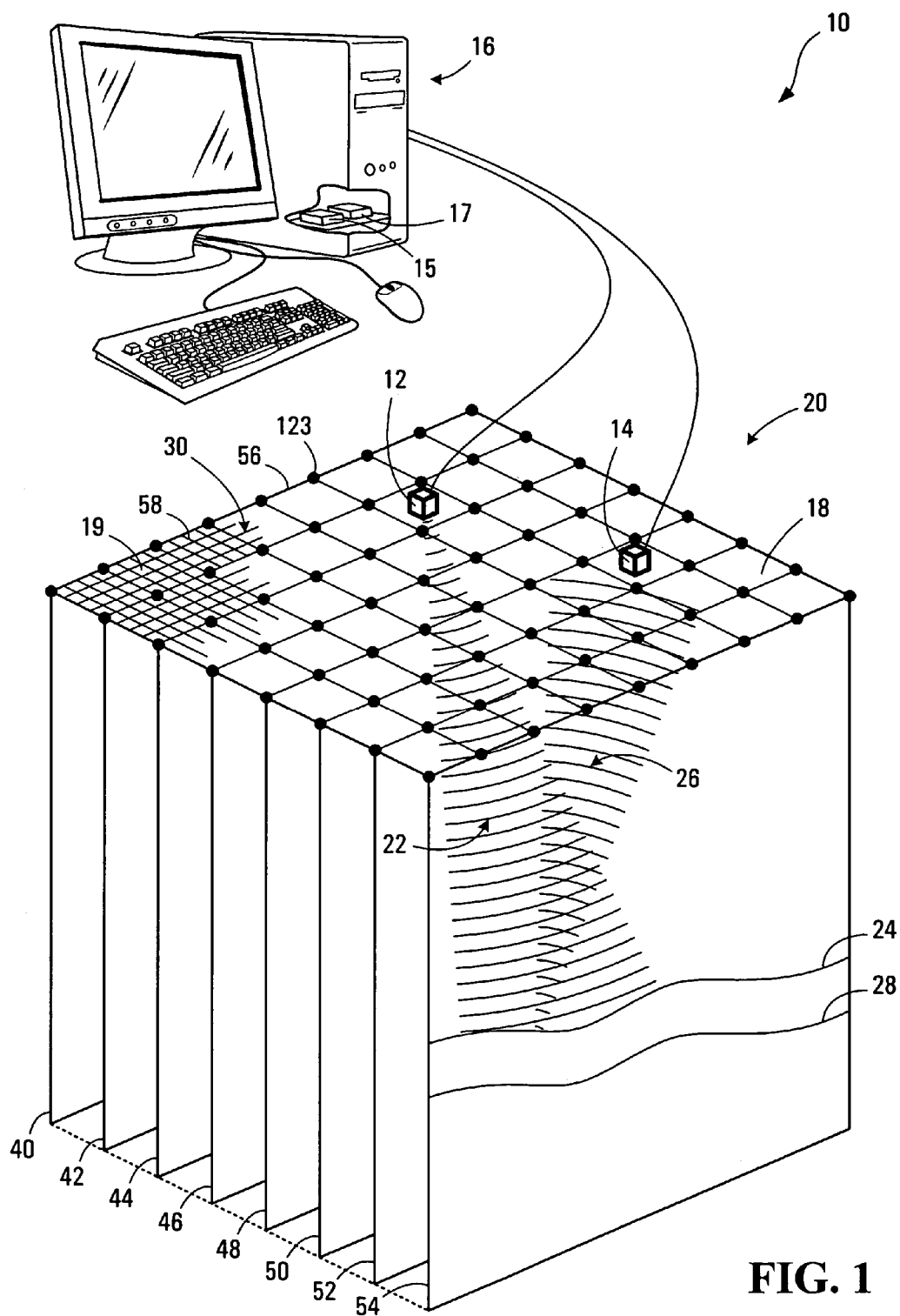
FIG. 1 is a system for processing seismic data to produce a velocity field, according to a first embodiment of the invention.

Referring to FIG. 1, a system according to a first embodiment of the invention is shown generally at 10. The system 10 includes a source 12 of seismic energy and at least one seismic receiver 14 in communication with a computer 16. When used on land, the seismic source 12 can be a high explosive charge electrically detonated in a borehole located at a selected point on a terrain 18 on the surface 20 of the earth, or another energy source having capacity for delivering a series of impacts or mechanical vibrations to the earth's surface 20, for example. An incident seismic wave 22 is generated in the earth's subsurface by the source 12 and is partially reflected back to the surface 20 from strata interfaces 24 and 28 as seismic reflections 26. These seismic reflections 26 reach different locations on the surface 20 of the earth at different times, depending on the distance and velocity characteristics of the subsurface traversed. The seismic receiver 14 is used to produce an electrical signal representing the seismic reflections 26 received at a location on the surface 20. A plurality of seismic receivers 14 may be employed in an array or line, for example to produce a plurality of electrical signals representing seismic reflections received at different locations. The seismic receivers 14 may be arranged in an array such as a line or two-dimensional grid along the surface 20 of the earth to permit seismic reflections 26 received at a plurality of locations on the surface 20 to be acquired for a given incident seismic wave 22.

The electrical signals produced by the receivers 14 are communicated to a sampling device which, in this embodiment, includes the computer 16. The computer 16 may sample the signals at 2 msec intervals, for example, to produce a set of amplitude vs. time sample values for each receiver 14 or receiver location. This set of amplitude vs. time sample values is associated with coordinates identifying the respective locations of the source 12 and receiver 14 on the surface 20 to produce what may be referred to as a reflection data set. A reflection data set may thus have the form: {Sx, Sy, Sz; Rx, Ry, Rz; (A1, T1); (A2, T2); (A3, T3); . . . (An, Tn)}, where Sx, Sy, and Sz represent the coordinates of the source 12, Rx, Ry and Rz represent the coordinates of the receiver 14, A1 . . . An represent amplitude at corresponding sample times T1 to Tn respectively.

A reflection data set is produced for each source/receiver location on the surface 20. In general, a plurality of reflection data sets is produced, to represent various source/receiver positions on the surface to facilitate seismic data analysis as described herein. The reflection data sets may be acquired onsite and stored for processing by the computer 16 or by a remotely located computer or computers. Reflection data sets produced for a plurality of source/receiver locations on the surface 20 arranged in a two-dimensional grid or one-dimensional line along the surface 20 may be referred to collectively as a set of raw three-dimensional (3D) seismic data, or 3D pre-stack data, for example. Reflection data sets produced for a plurality of source/receiver locations on the surface 20 arranged in a one-dimensional line along the surface 20 may be referred to collectively as a set of raw two-dimensional (2D) seismic data, or 2D pre-stack data if it is assumed that all seismic reflections 26 are from seismic reflectors directly beneath the line. In one embodiment, a collection of reflection data sets is provided to and stored in memory 15 of a seismic data processor. The computer 16, for example, may implement the seismic data processor if provided with computer readable program codes for directing a processor circuit 17 of the computer 16 to carry out a process for producing a 3D velocity field, according to one aspect of the invention. The program codes may be provided to the computer 16 by way of a computer readable medium such as a CD-ROM, for example, or by way of a signal received by the computer 16, the signal being encoded with the program codes.

The program codes are represented by a plurality of blocks depicted in flowcharts shown in FIGS. 2–6 and 11–12, which represent functional operations performed by the processor circuit 17 of the computer 16 on the collection of reflection data sets in accordance with the process for producing a 3D velocity field described herein.

Figure 2:
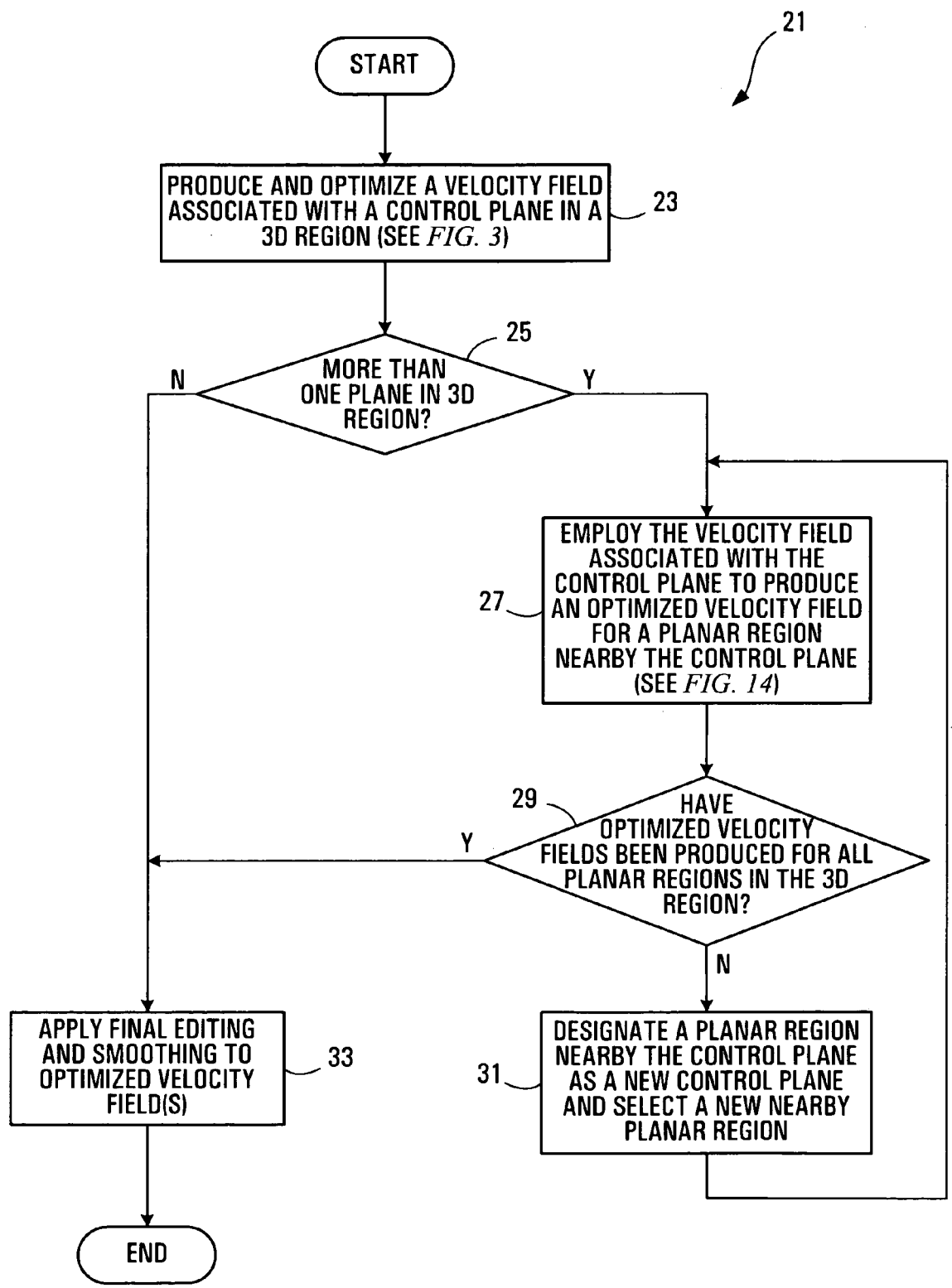
FIG. 2 is a flow chart representing blocks of code executed by a processor of the system shown in FIG. 1, for carrying out a process for processing seismic data to obtain a velocity field.

Referring to FIG. 2, in general, the program codes operate to cause the processor circuit 17 of the computer 16 to interact with the memory 15 to retrieve portions of the reflection data set as described below and operate on such portions to produce and store in the memory 15 or provide to an output device an optimized velocity field for a given planar region defined within a 3D region in the subsurface. In one aspect of the invention, the program codes direct the computer to employ a velocity field associated with a planar region defined nearby the given planar region, in an iterative optimization process. This optimization process may be repeated for different planar regions defined in the 3D region until optimized velocity fields for each planar region in the 3D region have been produced. The collection of optimized velocity fields associated with respective planar regions is a representation of the velocity field for the entire 3D region.

As a subprocess of the process above and according to another aspect of the invention, the program codes may direct the processor circuit 17 to interact with the memory 15 to carry out a process that causes the processor circuit to produce an estimate of a seismic velocity field from the seismic data. This may have separate stand-alone uses wherever an estimate of seismic velocity is desired.

As a further subprocess of the process above and according to another aspect of the invention, the program codes may direct the processor circuit 17 to interact with the memory 15 to carry out a process that causes the processor circuit to produce an initial velocity field estimate for use in the above process or in other processes that may require an initial velocity field estimate.

As a further subprocess of the process above and according to another aspect of the invention, the program codes may direct the processor circuit 17 to interact with the memory 15 to carry out a process that causes the processor circuit to produce an starting velocity field estimate for use in the above process or in other processes that may require an starting velocity field estimate. The starting velocity field estimate may be a precursor to the initial velocity field estimate above and may be produced from very raw estimates of velocities and the set of seismic data.

As a further subprocess of the process above and according to another aspect of the invention, the program codes may direct the processor circuit 17 to interact with the memory 15 to carry out a process that causes the processor circuit to produce a migrated velocity field for use in the above process or in other processes that may require a migrated velocity field.

As a further subprocess of the process above and according to another aspect of the invention, the program codes may direct the processor circuit 17 to interact with the memory 15 to carry out a process that causes the processor circuit to produce an output velocity field in response to an input velocity field and the seismic data, for use in the above process or in other processes that may require an output velocity field of this type.

As a further subprocess of the process above and according to another aspect of the invention, the program codes may direct the processor circuit 17 to interact with the memory 15 to carry out a process that causes the processor circuit to produce an optimized velocity field in response to the initial velocity field above and the seismic data, for use in the above process or in other processes that may require an optimized velocity field of this type.

A process for producing a 3D velocity field is shown generally at 21 in FIG. 2 and involves a first block 23 which directs the processor circuit 17 shown in FIG. 1, to produce and optimize a velocity field associated with a control plane defined within a 3D region.

Block 25 then directs the processor circuit 17 to determine whether or not there is more than one plane in the 3D region.

If there is more than one plane, block 27 directs the processor circuit 17 to employ the velocity field associated with the control plane to produce an optimized velocity field for a planar region nearby the control plane. On completion of block 27, an optimized velocity field for the planar region near the control plane is available and block 29 directs the processor circuit 17 to determine whether optimized velocity fields have been produced and stored in memory 15 for all planar regions defined in the 3D region. If optimized velocity fields have not been produced and stored, block 31 directs the processor circuit 17 to designate a planar region nearby the control plane as a new control plane and causes the processor circuit 17 to select a new planar region nearby the new control plane. The processor circuit 17 is then directed back to block 27. Blocks 27, 29 and 31 are repeated until optimized velocity fields have been produced and stored for all planar regions defined in the 3D region. When this occurs block 33 directs the processor circuit 17 to apply final editing and smoothing to the optimized velocity field or fields produced by the process. When there is only one plane defined in the 3D region (i.e. where 2D seismic data has been provided to the process and detected as only one plane in the 3D region at block 25), the processor circuit 17 is directed to block 33 directly.

The finally edited and smoothed velocity fields produced at block 33 may collectively be referred to as a 3D velocity field. When a 3D velocity field has been produced, the process shown in FIG. 2 is complete. The process is described in greater detail below with the above-mentioned subprocesses identified as appropriate.

Referring back to FIG. 1, because the velocity characteristics of the earth's subsurface usually change gradually in a lateral direction parallel to the earth's surface 20, the optimized velocity field for the control plane, defined normal to the earth's surface 20, is a good starting point or initial velocity field for producing an optimized velocity field for a second, nearby planar region. The process shown in FIG. 2 facilitates stepping through successively adjacent planar regions in the 3D region, to produce an optimized velocity field for each planar region using an optimized velocity field for an immediately preceding planar region as a starting point, for example.

To perform the above process, the collection of reflection data sets might first be pre-processed by the computer 16 or by a separate computer configured to pre-process the collection of reflection data sets into what will hereinafter be referred to as 3D seismic data. Pre-processing may involve reducing measurement errors introduced by the receivers, filtering such as deconvolution, scaling, and alignment of the collection of reflection data sets to positions on a grid. Reducing measurement errors introduced by the receivers, filtering and scaling are well known operations and will not be described further herein. Alignment of the collection of reflection data sets is described with reference to FIG. 1.

Referring to FIG. 1, it will be appreciated that the sources 12 and receivers 14 may be located anywhere within a two dimensional boundary on the surface 20 of the earth. The surface 20 may or may not be planar due to the natural contour of the earth and thus each source/receiver location associated with a reflection data set may initially be defined by coordinates that define the location in three dimensions relative to a reference point, such as a geodetic datum such as WGS-84. The coordinates and corresponding time-amplitude representations may then be mapped to describe aligned coordinates and time-amplitude representations associated with grid locations on a two-dimensional grid 19 on an imaginary flat surface 30 of the 3D region. The aligned coordinates and corresponding time-amplitude representations may be referred to as aligned reflection data sets.

A collection of aligned reflection data sets is provided as input to the process shown in FIG. 2, which begins with block 23, which directs the processor circuit 17 to produce and optimize a velocity field associated with a control plane within the 3D region. Block 23 is shown in greater detail in FIG. 3.

Figure 3:
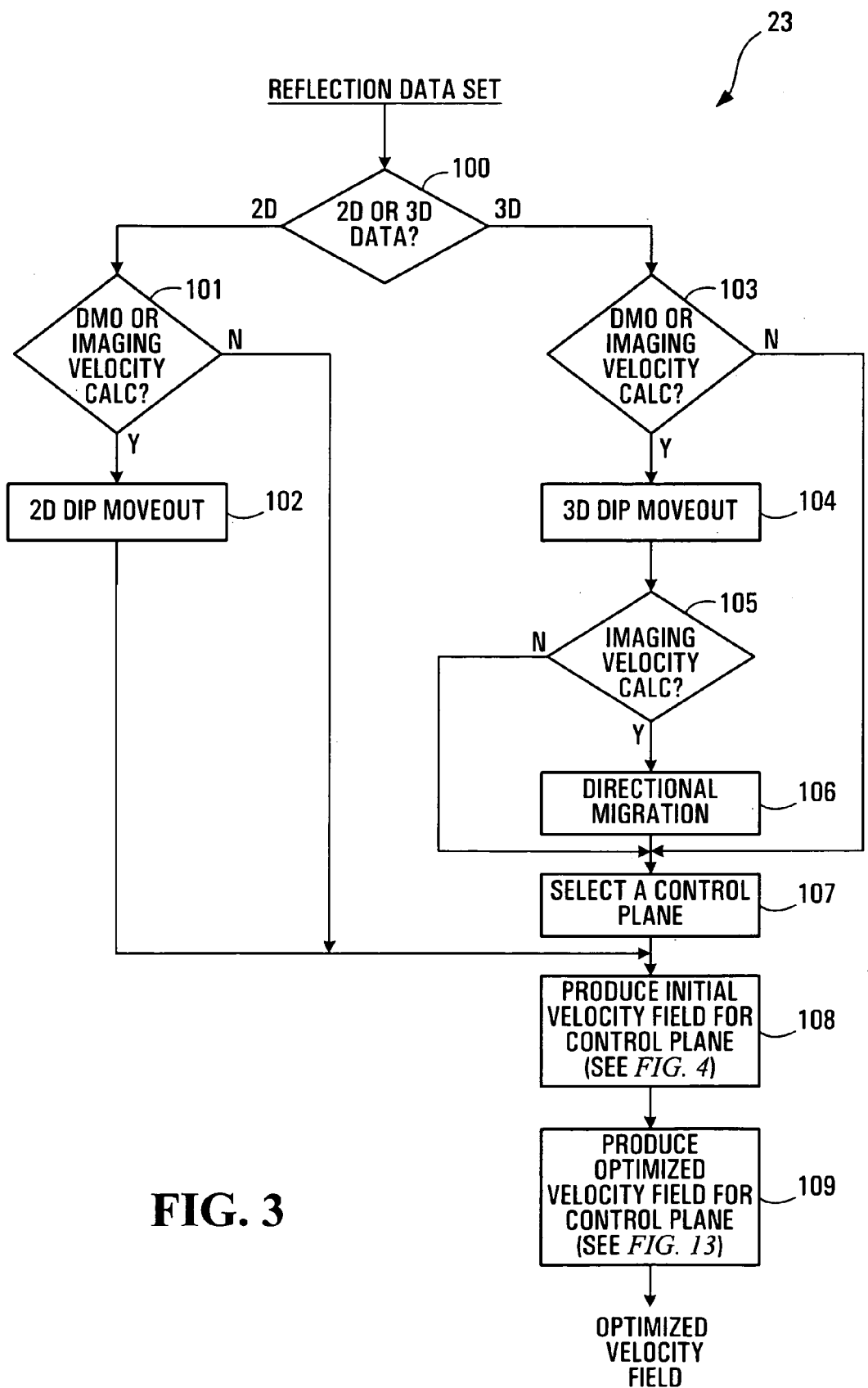
FIG. 3 is a flow chart representing blocks of code executed by the processor of the system shown in FIG. 1, for producing an estimate of a seismic velocity field for a planar region within a 3D region.

In general, the process shown in FIG. 3 is for estimating seismic velocity field from seismic data comprising time-amplitude representations associated with source-receiver locations spaced apart by an offset distance and having a midpoint therebetween, the seismic data being arranged into common midpoint gathers associated with respective CMP locations. Aside from some initial data handling based on the type of velocity field sought and the type of seismic data supplied, the process shown in FIG. 3 involves defining a control plane having an edge intersecting a plurality of the CMP locations, producing an initial velocity field for the control plane, the initial velocity field comprising a plurality of time-velocity values for each of the CMP locations and producing an optimized velocity field for the control plane by adjusting the time-velocity values for each of the CMP locations in response to trends, relative to offset distance, in time values, associated with common seismic events, until the optimized velocity field satisfies a condition.

In particular, in connection with the overall process described herein, a first block 100 of the process 23 directs the processor circuit 17 to receive a reflection data set and to look at a flag contained in that set to determine whether or not source and receiver locations are provided in a 2D format or a 3D format. If these locations are provided in a 2D format, the processor circuit 17 is directed to block 101 which causes it to determine whether the velocity sought to be calculated is a DMO or imaging velocity. User-input may be provided to indicate this to the processor circuit 17. If DMO or imaging velocity is to be calculated, block 102 directs the processor circuit 17 to perform a two-dimensional Dip Moveout operation, using known techniques, for example, to produce DMO data. Techniques for performing a dip moveout operation are described in O. Yilmaz, *Seismic Data Processing*, in S. M. Doherty, ed., Investigations in Geophysics No. 2 (Society of Exploration Geophysicists) and described in J. B. Bednar, "A Theoretical Comparison of Equivalent-Offset Migration and Dip Moveout—Prestack Imaging" (1999) 64 Geophysics, incorporated herein by reference. If DMO or imaging velocity is not to be calculated, i.e. brute velocity is to be calculated, the processor circuit 17 is directed straight to block 108 described below. Otherwise, after performing the 2D Dip Moveout operation at block 102, the processor circuit 17 is directed to block 108.

If at block 100 the reflection data sets are found to be 3D data, the processor circuit 17 is directed to block 103 which causes it to determine whether the velocity sought to be calculated is a DMO or imaging velocity. If so, block 104 directs the processor circuit 17 to perform a 3D Dip Moveout operation to produce DMO reflection data sets. Block 105 then directs the processor circuit 17 to determine whether the velocity sought to be calculated is an imaging velocity and if so, block 106 directs the processor circuit 17 to perform a directional migration on the DMO data to produce a 3D cube of data in which planar regions can be treated like 2D data sets. Referring to FIG. 1, planar regions 40, 42, 44, 46, 48, 50, 52, 54 are defined in the 3D region and have edges, one of which is shown at 56, coincident with respective grid lines of the grid 19 on the imaginary flat surface 30 of the 3D region. The DMO data produced at block 106 includes amplitude representations that are associated with grid positions, such as shown at 58, on a grid line coincident with an edge of a planar region and may be referred to as a 2D array of seismic data. The use of the term "array" is not intended to in any way to limit the scope of data structures that may be used by computer 16, for example, to store seismic data, including the sets of DMO directionally migrated data. Thus, there is a plurality of parallel planar regions 40, 42, 44, 46, 48, 50, 52, 54 within the 3D region and each planar region (e.g., 40) has an associated set of amplitude representations for a plurality of positions (e.g., 58) on an edge (e.g., 56) thereof.

Referring back to FIG. 3, if at block 103 the velocity to be calculated is not a DMO or imaging velocity, i.e. it is a brute velocity, the processor circuit 17 is directed to block 107, directly. If at block 105 it is determined that the velocity to be calculated is not an imaging velocity i.e. it is a DMO velocity, the processor circuit 17 is directed to bypass block 106 and proceed directly to block 107.

Block 107 directs the processor circuit 17 to select, as a control plane such as planar region 40 from among the plurality of planar regions 40, 42, 44, 46, 48, 50, 52, 54 within the 3D region. Selection may occur in response to user input, for example. A user may be presented with a graphical image of the planar regions 40, 42, 44, 46, 48, 50, 52, 54, for example and may select a particular planar region, such as planar region 40, for example, as a control plane. The control plane will be used as a starting plane for which an initial velocity field will be produced and then optimized and then used as an initial velocity field for optimizing a velocity field of a planar region nearby the control plane. Any planar region within the 3D region may be selected as the control plane. For simplicity, the control plane may be a planar region at the left-hand side or right-hand side of the 3D region as depicted in FIG. 1, for example, and velocity fields for successive planar regions successively further from the left-hand side or the right hand side may be produced in succession, for example. Alternatively, a planar region in the centre of the 3D region may be selected as the control plane and optimized velocity fields for planar regions to the left of the control plane may be produced and then optimized velocity fields for planar region to the right of the control plane may be produced, for example. Alternatively, a plurality of control planes may be selected and separately processed to produce respective initial and optimized velocity fields for use in optimizing velocity fields of planar regions nearby the respective control planes within the 3D region.

Referring back to FIG. 3, after a control plane is selected, block 108 directs the processor circuit 17 to produce an initial velocity field for the control plane in response to the data associated with the control plane. If the reflection data set was for a 2D plane, block 108 directs the processor circuit 17 to produce an initial velocity field for the vertical plane extending into the earth with which the 2D reflection data set is associated. In this case, this vertical plane acts as the control plane. If the reflection data sets were found by block 100 to be 3D data, but block 106 was not carried out, it is assumed that the seismic data is already arranged as 2D arrays of seismic data respectively associated with planar regions, such as planar regions 40, 42, 44, 46, 48, 50, 52, 54 shown in FIG. 1, for example.

Figure 4:
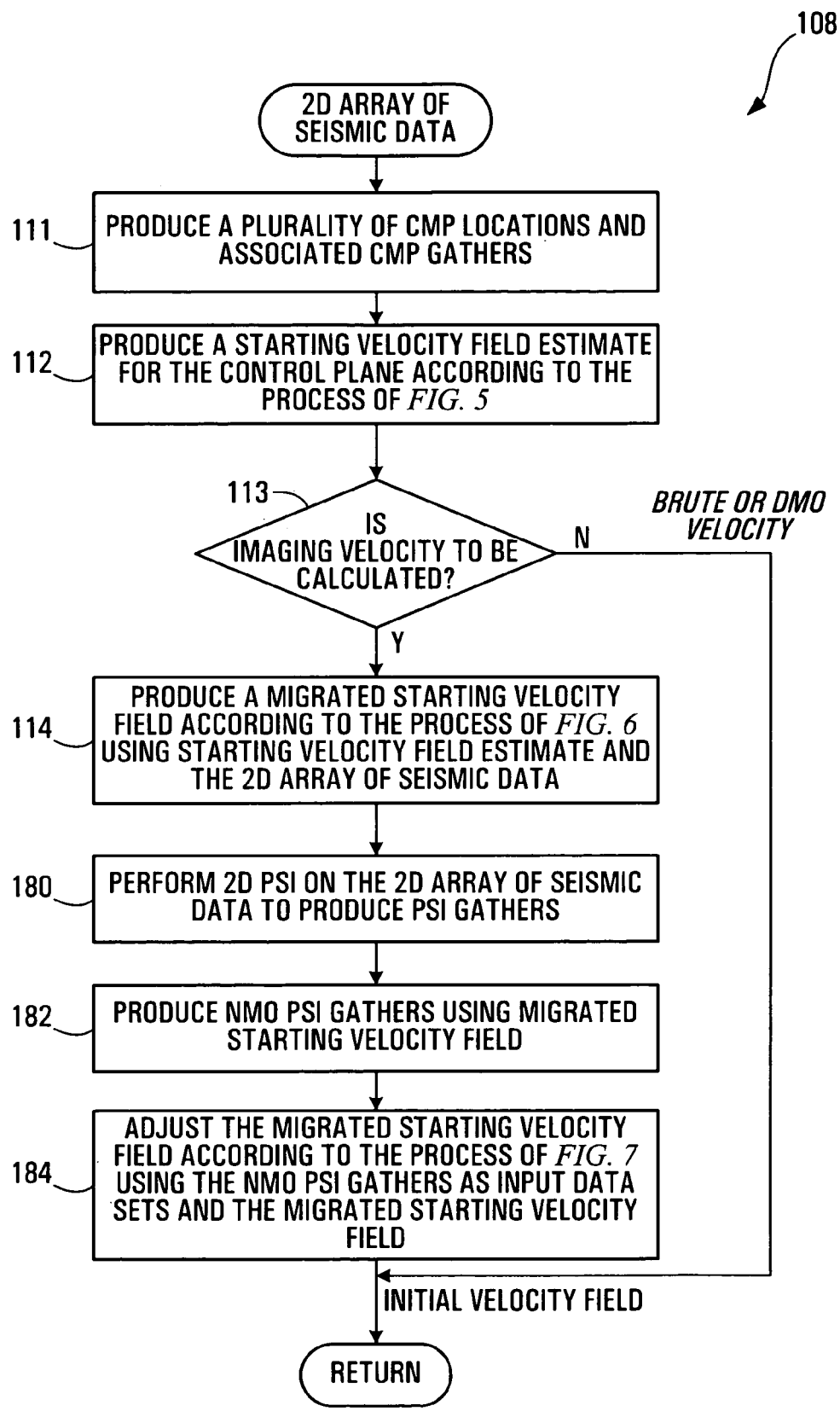
FIG. 4 is a flow chart representing blocks of code executed by the processor of the system shown in FIG. 1, for producing an initial velocity field for a control plane in the 3D region shown in FIG. 1.

Referring to FIG. 4, block 108 is shown in greater detail. In general, the process shown in FIG. 4 is for producing an initial velocity field estimate for a control plane from seismic data associated with the control plane including time-amplitude representations associated with source-receiver locations spaced apart by an offset distance and having a midpoint therebetween, the seismic data being arranged into common midpoint (CMP) gathers associated with respective CMP locations and the control plane having an edge intersecting a plurality of the CMP locations. In general, the process shown in FIG. 4 involves producing a starting velocity field estimate from an initial range of velocity values and an initial range of time values, producing a migrated starting velocity field from the starting velocity field estimate and the seismic data, producing pre-stack imaged gathers by performing a 2-dimensional pre-stack imaging process on the seismic data, producing normal moveout gathers in response to the migrated starting velocity field, performing a normal moveout operation on the pre-stack imaged gathers and adjusting the migrated starting velocity field in response to the normal moveout gathers and the migrated starting velocity field to produce a plurality of time-velocity values for each of the CMP locations, the plurality of the time-velocity values acting as the initial velocity field.

In particular, in connection with the overall process described herein, a first block 111 directs the processor circuit 17 to define a plurality of common midpoint (CMP) locations along an edge of the control plane, such as the edge 56 shown in FIG. 1, of the control plane and associate CMP gathers therewith. One such CMP location is shown at 123 along the edge 56 of the control plane. The processor circuit 17 may alternatively have been previously directed to define CMP locations, such as during the pre-processing function described above or during the directional migration process of block 100, shown in FIG. 3, for example. Each CMP location may be defined as a midpoint location between respective locations of seismic source 12 and receiver 14 pairs. Alternatively, producing the CMP locations may be performed in response to user input to the computer 16, for example, by providing a list of coordinates representing CMP locations along a grid line coincident with an edge 56 of the control plane.

The CMP gathers are respective subsets associated with one CMP location in the plurality of CMP locations along an edge of the control plane and include time-amplitude representations associated with source 12 and receiver 14 pairs of locations that have a common midpoint therebetween and an offset value representing the distance along the imaginary flat surface 30 between the associated respective source 12 and receiver 14 locations. A CMP gather is thus comprised of a plurality of seismic data records of the form: {CMP; offset; Sx, Sy, Sz; Rx, Ry, Rz; (A0, T0); (A1, T1,); . . . (An, Tn)} where

CMP represents the CMP location;

offset represents the distance between the source and receiver;

Sx, Sy, Sz are the coordinates of the source;

Rx, Ry, Rz are the coordinates of the receiver; and (A0, T0)-(An, Tn) is the time amplitude representation for the CMP location.

Block 112 of the process shown in FIG. 4 directs the processor circuit 17 to produce a starting velocity field estimate for the selected control plane in response to the data associated with the selected control plane. The estimated starting velocity field is processed to relate velocity values with CMP locations to produce time velocity profiles for each respective defined CMP location.

Figure 5:
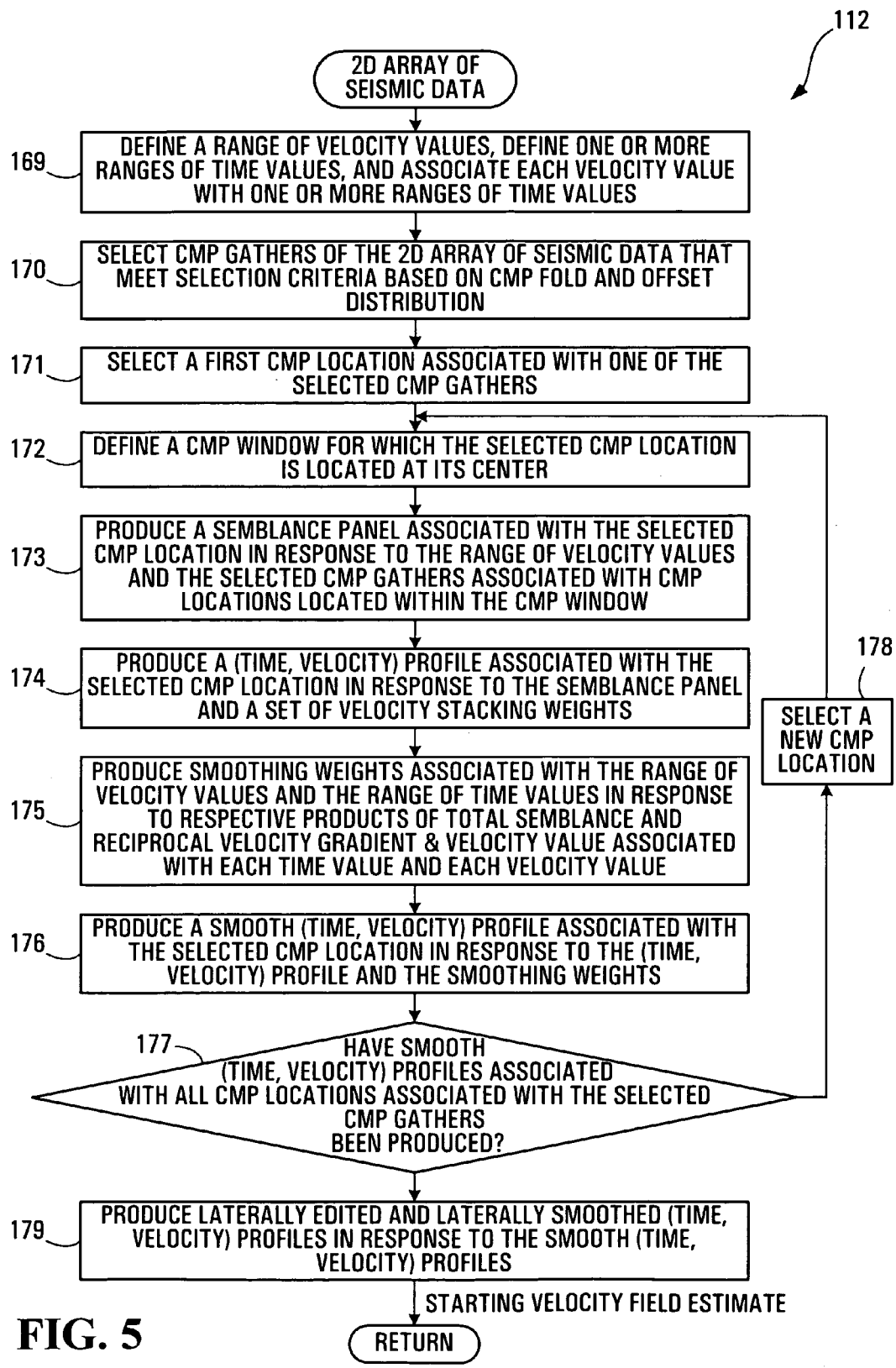
FIG. 5 is a flow chart representing blocks of code executed by the processor shown in FIG. 1, for producing a starting velocity field estimate for the control plane.

FIG. 5 provides more detail as to how block 112 of FIG. 4 may be implemented. In general, the process shown in FIG. 5, is for producing a starting velocity field estimate from seismic data including time-amplitude representations associated with source-receiver locations spaced apart by an offset distance and having a midpoint therebetween, the seismic data being arranged into common midpoint (CMP) gathers associated with respective CMP locations. In general, the process shown in FIG. 5 involves defining a range of velocity values, defining one or more ranges of time values and associating each velocity value of the range of velocity values with one or more corresponding ranges of time values and for each of a plurality of CMP gathers defining a window in which a selected CMP location associated with each CMP gather is centered, producing a semblance panel associated with the selected CMP location, in response to the range of velocity values and selected CMP gathers associated with CMP locations within the window. The process further involves producing a time-velocity profile associated with the selected CMP location in response to the semblance panel and a set of velocity stacking weights, producing smoothing weights for each velocity value of the range of velocity values and each time value of the one or more ranges of time values in response to respective products of total semblance and reciprocal velocity gradient associated with each time value and each velocity value and producing a smooth time-velocity profile associated with the selected CMP location in response to the time-velocity profile and the smoothing weights.

In particular, in connection with the overall process described herein, the process shown in FIG. 5 is used to produce a starting velocity field for the selected control plane begins with a first block 169 that directs the processor circuit 17 to define a range of velocity values, define one or more ranges of time values, and associate each velocity value with one or more corresponding ranges of time values. The defined range of velocity values may include potentially accurate velocity values for the control plane and may be defined in response to user input, for example. The user may provide as input a range of velocity values encompassing more than an expected range of velocity values based on known characteristics of the 3D region, known characteristics of another 3D region potentially having similar geophysical features, or the known characteristics of the earth's entire subsurface, for example. The expected range of velocity values may be provided by a seismic data analysis expert, for example. Alternatively, the defined range of velocity values may be produced automatically by the computer 16 or by another computer operable to produce a defined range of velocity values. The one or more ranges of time values may each include subsets of the time sample values T1 . . . Tn of the reflection data sets forming the data associated with the control plane.

Block 170 then directs the processor circuit 17 to select CMP gathers of the DMO directionally migrated data associated with the control plane that meet selection criteria based on a respective CMP fold and a respective offset distribution associated with each CMP gather. The CMP fold of a given CMP gather is the number of seismic traces in the given CMP gather. Selecting CMP gathers may include selecting CMP gathers that have at least a minimum CMP fold. Selecting CMP gathers may also include selecting CMP gathers for which the maximum offset value found in the seismic data records forming the CMP gather is at least equal to a minimum offset selection criterion value.

Block 171 then directs the processor circuit 17 to select a first selected CMP location associated with a first CMP gather of the CMP gathers selected in accordance with block 170. For simplicity, the first selected CMP location may be located at one end of the edge 56 of the control plane shown in FIG. 1.

Block 172 then directs the processor circuit 17 to define a CMP window for such that the selected CMP location will be located at the center of the CMP window. The width of the CMP window may be determined as a percentage of the total distance between two extreme end CMP locations located furthest apart from each other, for example.

Block 173 then directs the processor circuit 17 to produce a composite semblance panel associated with the selected CMP location in response to the range of velocity values and the selected CMP gathers that are associated with CMP locations located within the CMP window. The semblance panel of a single isolated CMP location is the plurality of semblance values calculated for each velocity value within the range of velocity values, at each time value. The composite semblance panel at a given CMP location may be a weighted sum of the isolated CMP semblance panels of all selected CMP locations within the CMP window. The weighted sums may be calculated on a constant time slice at a time, with the weights coming from outlier detection using median filtering, and the reciprocal of the distance of the CMP location in the CMP window from the selected CMP location.

Block 174 then directs the processor circuit 17 to produce a time-velocity profile associated with the selected CMP location in response to the semblance panel and a set of velocity stacking weights. The time-velocity profile associated with the selected CMP location may be produced by combining the velocity values used to produce the semblance panel in accordance with block 173 and respectively associated with each time value of the selected CMP gathers that are associated with CMP locations located within the CMP window. Combining may include performing a weighted stack of the velocity values respectively associated with each of the time values. The weighted stack may be performed in response to a set of velocity stacking weights. The velocity stacking weights may be the semblance values associated with each velocity value and time value in the composite semblance panel.

Block 175 then directs the processor circuit 17 to produce smoothing weights associated with the range of velocity values and the one or more ranges of time values in response to respective products of total semblance and reciprocal velocity gradient associated with each time value and each velocity value.

Block 176 then directs the processor circuit 17 to produce a smooth time-velocity profile associated with the selected CMP location in response to the time-velocity profile produced in accordance with block 174 and the smoothing weights produced in accordance with block 175. Producing the smooth time-velocity profile may include using the smoothing weights to fit a smooth curve to the time-velocity profile.

After the smooth time-velocity profile associated with the selected CMP location has been produced, block 177 directs the processor circuit 17 to determine whether all the defined CMP locations have been selected and whether respective smooth time-velocity profiles have been produced therefor. If not, block 178 directs the processor circuit 17 to select a new CMP location and then directs the processor circuit 17 to produce a new smooth time-velocity profile associated with the new CMP location in accordance with blocks 172, 173, 174, 175 and 176. If smooth time-velocity profiles have been produced for each CMP, block 179 directs the processor circuit 17 to produce laterally edited and laterally smoothed time-velocity profiles in response to the smooth time-velocity profiles just produced. The laterally edited and laterally smoothed time-velocity profiles associated with respective CMP gathers may collectively be referred to as a starting velocity field estimate for the control plane.

Figure 8:
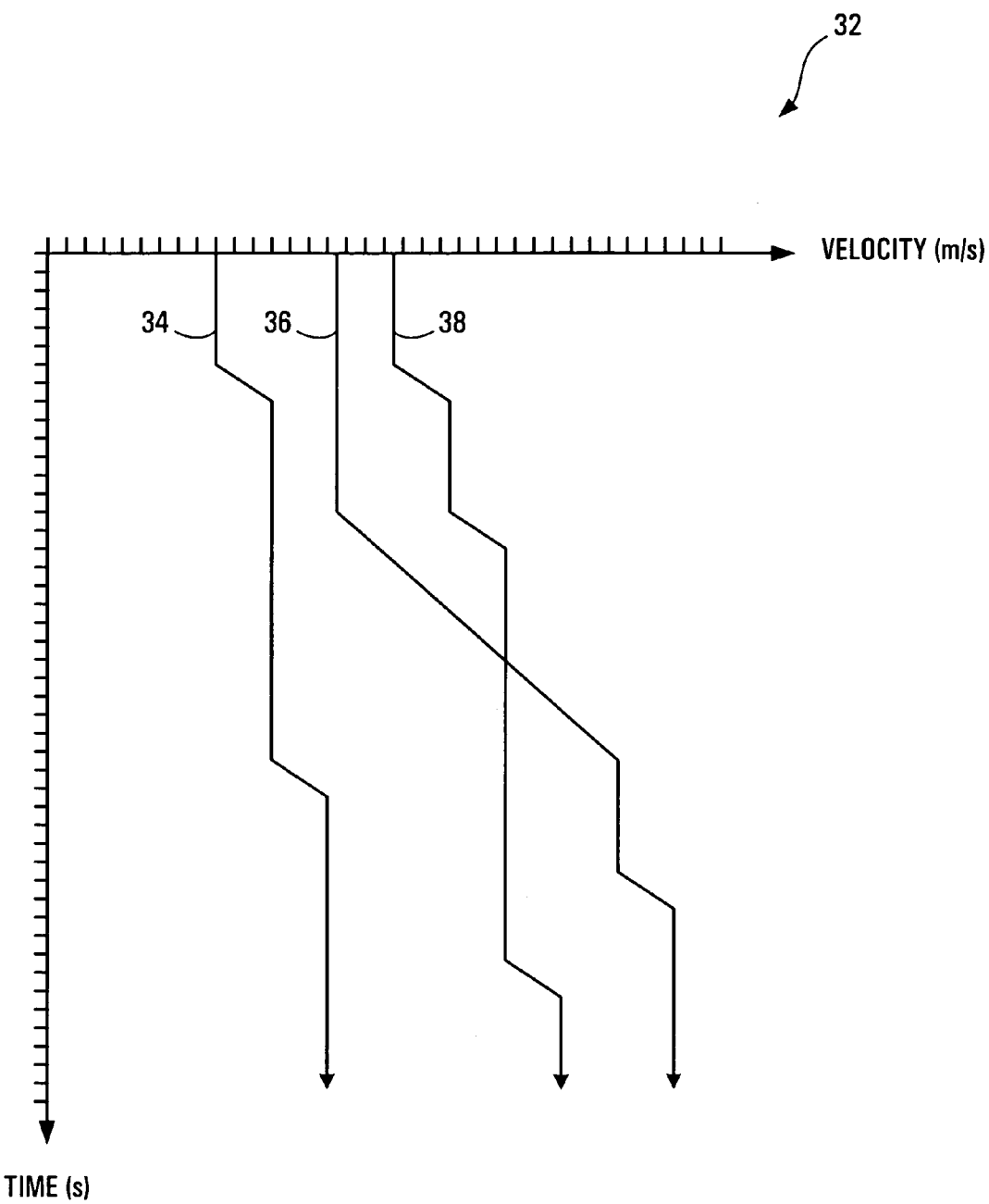
FIG. 8 is a graphical representation of an input velocity field that is used as an input to the process shown in FIG. 7.

A representation of a starting velocity field is shown generally at 32 in FIG. 8. Referring to FIG. 8, the starting velocity field may be as depicted generally at 32, for example, and may include time-velocity representations such as shown at 34, 36 and 38. Each time-velocity representation 34, 36 and 38 is associated with a respective CMP location and associates velocity values with respective time values for that location. Each velocity value may represent a root-mean-square (RMS) velocity that the incident seismic wave 22 would have after travelling from a corresponding CMP location, initially in a direction normal to the imaginary flat surface 30 into the earth's subsurface, for an amount of time equal to its associated time value, for example. Each velocity value may alternatively represent an average velocity, a layer interval velocity, or a local interval velocity, for example.

Referring back to FIG. 4, after a starting velocity field estimate has been produced at block 112, block 113 directs the processor circuit 17 to determine whether an imaging velocity is sought. If so, block 114 directs the processor circuit 17 to produce a migrated starting velocity field using the starting velocity field estimate and the data associated with the control plane. The process by which this is done is shown in greater detail at 114 in FIG. 6.

Figure 6:
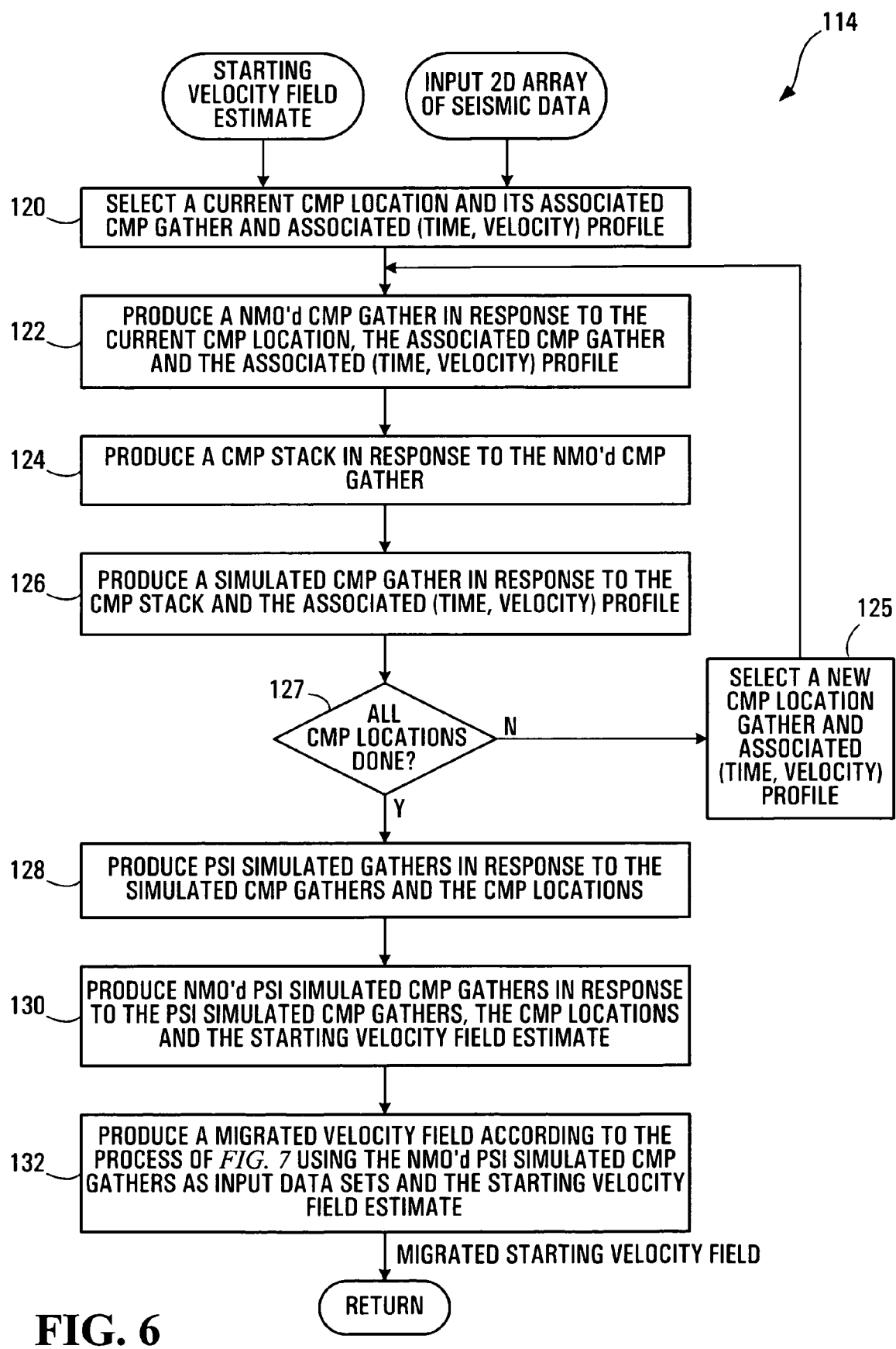
FIG. 6 is a flow chart representing blocks of code executed by the processor of the system shown in FIG. 1, for producing a migrated starting velocity field in response to the starting velocity field estimate and the 2D array of seismic data.

In general, the process shown in FIG. 6 involves producing a migrated velocity field in response to seismic data including time-amplitude representations associated with source-receiver locations spaced apart by an offset distance and having a midpoint therebetween, the seismic data being arranged into common midpoint (CMP) gathers associated with respective CMP locations and a starting velocity field estimate comprising time-velocity profiles associated with respective CMP locations. In general, the process shown in FIG. 6, involves for each of the CMP locations, producing a normal moveout gather in response to the starting velocity field estimate and the seismic data associated with each CMP location producing a CMP stack in response to a corresponding the normal moveout gather, producing a simulated CMP gather in response to a corresponding CMP stack and a corresponding time-velocity profile, producing pre-stack imaged simulated gathers in response to a plurality of respective simulated CMP gathers and respective CMP locations, producing normal moveout pre-stack imaged simulated gathers in response to the pre-stack imaged simulated gathers, the CMP locations and the starting velocity field estimate and producing the migrated velocity field in response to the normal moveout pre-stack imaged simulated gathers and the starting velocity field estimate.

In particular, in connection with the overall process described herein, inputs to the process carried out by block 114 include the starting velocity field estimate and the 2D array of seismic data associated with the control plane. A first block 120 of the process directs the processor circuit 17 to select a current CMP location, its associated current CMP gather as a current CMP gather and its associated time velocity profile as a current time velocity profile. Any CMP location may be selected as the current CMP location, such as for example the CMP location 123 shown in FIG. 1. For simplicity, a first current CMP location may be the CMP location at one end of the edge 56 of the control plane, for example.

Block 122 of FIG. 6 then directs the processor circuit 17 to produce a CMP gather after normal moveout correction (NMO'd CMP gather) in response to the current CMP location, its associated CMP gather and its associated time velocity profile.

To perform a NMO operation, effectively, block 122 directs the processor circuit 17 to time shift the amplitude values of the time-amplitude representations of the seismic data record for the current CMP gather. To do so, block 122 associates each amplitude value of each time-amplitude representation of the CMP gather with a new zero-offset time value determined according to the following NMO travel time equation:

$$t^2(0) = t^2(x) - \frac{x^2}{v^2} \qquad (1)$$

where
t(0) is the zero-offset time value respectively associated with each amplitude value of each time-amplitude representation after the NMO operation is performed;
t(x) is the time value respectively associated with each amplitude value of each time-amplitude representation before the NMO operation is performed;
x is the offset respectively associated with each time-amplitude representation of the current CMP gather; and
v is a reference velocity value given by time-velocity representation at time t(0).

The amplitude values of the time-amplitude representations of the current CMP gather are shifted in the manner described above and the resulting time-amplitude representations may each have the form {CMP; (A0, T0) . . . (An, Tn)} and may be collectively referred to an NMO'd CMP gather.

Block 124 then directs the processor circuit 17 to produce a CMP stack in response to the NMO'd CMP gather. For each time value associated with each NMO'd seismic data record for the NMO'd CMP gather associated with the current CMP location, a stacking operation is performed by summing amplitude values associated with each time value to obtain a single summed, or stacked, amplitude value for each time value. Thus the process depicted by block 124 produces a CMP stack by associating stacked amplitude values with corresponding time values for the current CMP location e.g., {CMP; (A0, T0) . . . (An, Tn)}.

Stacking is described generally by O. Yilmaz, *Seismic Data Processing*, in S. M. Doherty, ed., Investigations in Geophysics No. 2 (Society of Exploration Geophysicists), incorporated herein by reference.

Block 126 directs the processor circuit 17 to produce a simulated CMP gather in response to the CMP stack associated with the current CMP location and the time-velocity representation, associated with the current CMP location. To do this, block 126 directs the processor circuit 17 to produce a plurality of desired offset values. The desired offset values may be equal to the offset values associated with the current CMP gather selected according to block 121, may be produced in response to the starting field estimate, or may be produced in response to user input, for example. The user may, for example, provide a list of offset values as an input to the computer 16. The simulated CMP gather may be produced by mapping each stacked amplitude value of the CMP stack to a plurality of simulated amplitude values, each simulated amplitude value being associated with a respective desired offset value. All amplitude values associated with the same desired offset value form one simulated time-amplitude representation of the simulated CMP gather. The mapping operation may be performed in accordance with the NMO travel time equation (1) provided above where the velocity values are obtained from the current time-velocity profile. Thus, the process depicted by block 126 produces a simulated CMP gather similar to the current CMP gather, but one that includes time-amplitude representations having an improved signal-to-noise ratio among amplitude values corresponding to each seismic event along the time-offset curve dictated by the velocity, and being associated with a more uniform range of offset values.

Block 127 directs the processor circuit 17 to determine whether simulated CMP gathers have been produced for each CMP and if not, block 125 directs the processor circuit 17 to select a new CMP location, gather and associated time-velocity profile. The processor circuit 17 is then directed to repeat the processes of blocks 122, 124 and 126 until a simulated CMP gather is produced for each CMP location.

After all simulated CMP gathers associated with respective CMP locations have been produced, block 128 directs the processor circuit 17 to perform a pre-stack imaging process to produce pre-stack imaged (PSI) simulated CMP gathers in response to the simulated CMP gathers and the set of CMP locations. The pre-stack imaging process may be a velocity-independent process, such as that described in J. B. Bednar, "A Theoretical Comparison of Equivalent-Offset Migration and Dip Moveout—Prestack Imaging" (1999) 64 Geophysics, incorporated herein by reference. Velocity-independent pre-stack imaging may include mapping each simulated time-amplitude representation of the simulated CMP gathers to a corresponding PSI time-amplitude representation of the PSI simulated CMP gathers. More particularly, the pre-stack imaging process of block 128 directs the processor circuit 17 to map time-amplitude representations associated with a given CMP location and a given offset value to a new CMP location and a new offset value according to the following pre-stack imaging equations:

$$m_0 = m + h\frac{\partial h}{\partial m} \text{ and} \quad (2)$$

$$h_0^2 = h^2 + h^2\left(\frac{\partial h}{\partial m}\right)^2 \quad (3)$$

where
m is the given CMP location;
$m_0$ is the new CMP location;
h is the given offset value; and
$h_0$ is the new offset value.

Block 130 then directs the processor circuit 17 to produce NMO'd PSI simulated CMP gathers in response to the PSI simulated CMP gathers and the CMP locations and the respective velocity profiles of the starting velocity field estimate. The NMO operation of block 130 may be performed by a process substantially similar to that described in connection with block 122 described above. In effect, block 130 directs the processor circuit 17 to time shift the amplitude values of each time-amplitude representation of each PSI simulated CMP gather.

Block 132 then directs the processor circuit 17 to produce a migrated reference velocity field in response to the NMO'd PSI simulated CMP gathers, the associated CMP locations and the associated velocity profiles of the starting velocity field estimate. To do this, block 132 directs the processor circuit 17 to call a velocity analysis routine as shown in FIG. 7.

Figure 7:
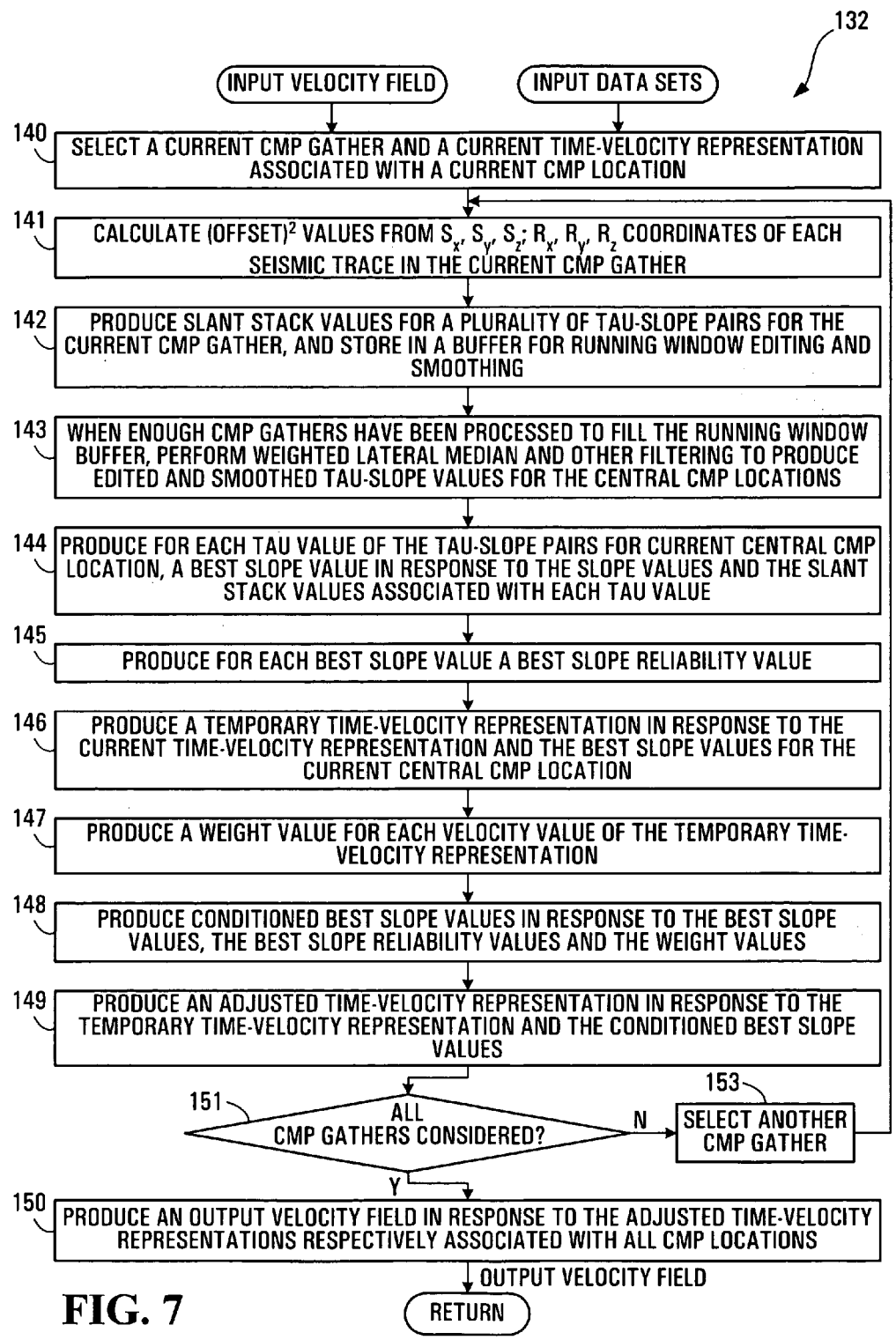
FIG. 7 is a flow chart representing blocks of code executed by the processor of the system shown in FIG. 1, for producing an output velocity field by adjusting an input velocity field and seismic data.

In general, the process shown in FIG. 7 involves producing an output velocity field in response to an input velocity field and seismic data including time-amplitude representations associated with source-receiver locations spaced apart by an offset distance and having a midpoint therebetween, the seismic data being arranged into common midpoint (CMP) gathers associated with respective CMP locations. In general, the process shown in FIG. 7 involves, for each of the CMP locations, and for each of a plurality of common seismic events, finding a slope of a curve approximating a trend, relative to offset, in time values, associated with the common seismic event, by producing slant stack values for a plurality of time(tau)-slope pairs, producing for each time value of the time(tau)-slope pairs a best slope value in response to the time(tau)-slope pairs and the slant stack values, producing a temporary time-velocity representation in response to the input velocity field and a plurality of the best slope values and conditioning the plurality of best slope values to produce conditioned best slope values and producing an adjusted time-velocity representation in response to the temporary time-velocity representation and the conditioned best slope values.

In particular, in connection with the overall process described herein, the process shown in FIG. 7 causes the processor circuit 17 to receive as inputs an input velocity field referenced to CMP locations and input data sets, each input data set being associated with a respective CMP location. The input velocity field includes a plurality of time-velocity representations, each time-velocity representation being associated with a respective CMP location.

Figure 9:
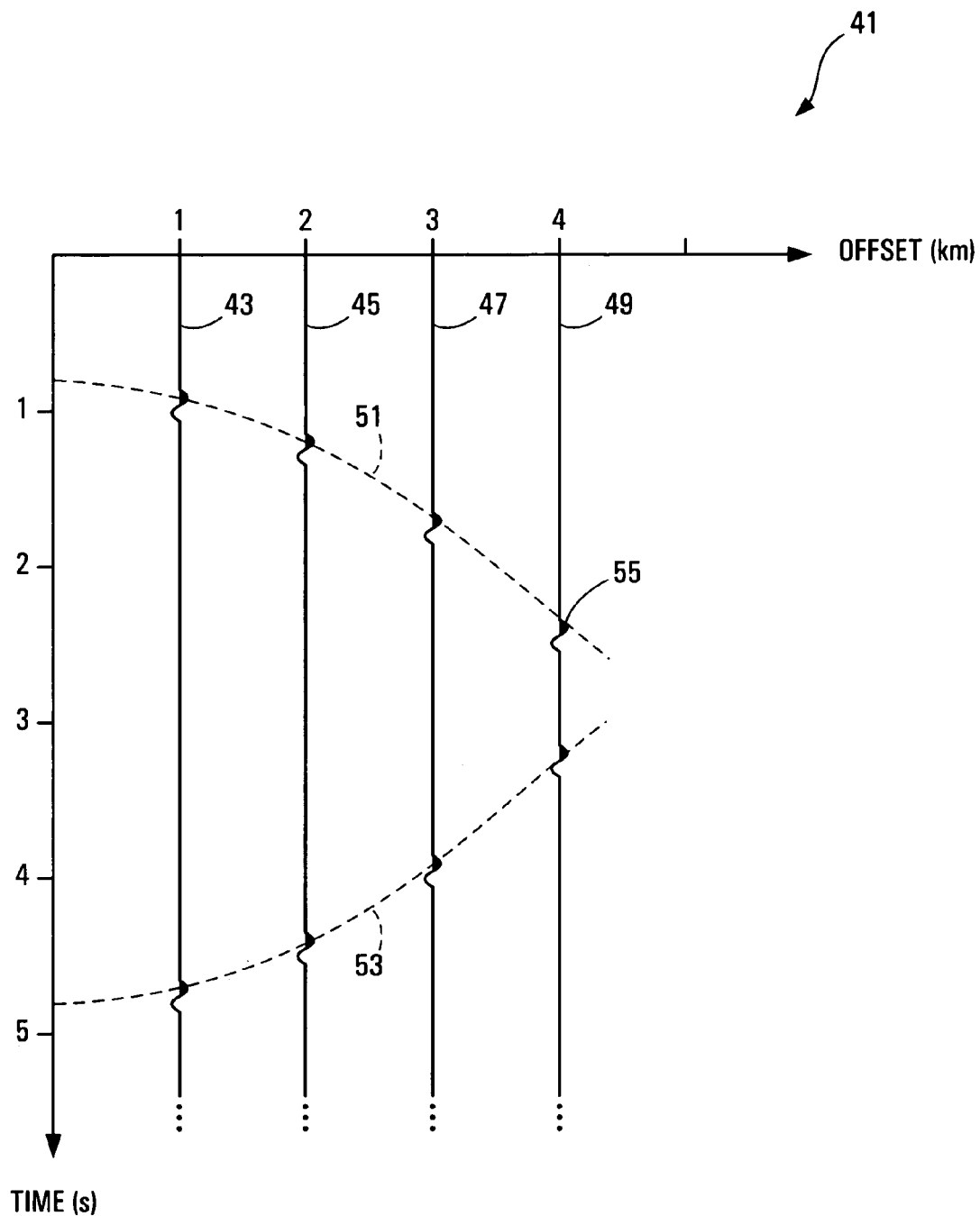
FIG. 9 is a graphical representation of a current CMP gather that is used as an input to the process shown in FIG. 7.

Referring to FIG. 9, an exemplary input data set for a given CMP is shown generally at 41 and includes four time-amplitude representations 43, 45, 47, 49 associated with respective offset values, referenced to a time-offset coordinate system having a downwardly increasing vertical time axis and a rightwardly increasing horizontal offset axis. Offset values may be expressed in units of distance, such as kilometres. Each time-amplitude representation 43, 45, 47, 49 may be represented graphically as a vertical line extending parallel to the vertical time axis from a point on the horizontal offset axis indicating its associated offset value. Each point 55, for example of each time-amplitude representation 43, 45, 47, 49 may be associated with an amplitude value, a time value and the associated offset value for a respective time-amplitude representation 43, 45, 47, 49. Positive amplitude values may be shown as shaded regions alongside a corresponding vertical line.

As shown in FIG. 9, a first broken curve 51 depicts a downward trend in time values with respect to offset value, for given amplitude values associated with a first seismic event at a first strata interface 24 (FIG. 1). Similarly, a second broken curve 53 depicts an upward trend in time values with respect to offset value, for given amplitude values associated with a second seismic event at a second strata interface 28 (FIG. 1). If the first and second curves 51 and 53 are horizontal, the time-velocity representation, associated with the current CMP location, of the input velocity field is considered to be correct. If the first or second broken curve 51 and 53 slopes downwardly, processing of the time and amplitude values of the current input data set has been done with a time-velocity representation having velocity values that are too high. If the curve trends upwardly, processing of the time and amplitude values of the current input data set has been done with a time-velocity representation having velocity values that are too low. In general, the trend in amplitude values associated with a subsurface feature is approximately parabolic when non-optimal velocity values are employed. By fitting a parabolic curve to a trend in amplitude values, a quantification of the error in the velocity values can be made and employed to correct the velocity values as described below. Effectively, the process shown in FIG. 7 serves to adjust velocity values of the input velocity field to cause the curves 51 and 53 shown in FIG. 9, for each seismic event to be as close as possible to horizontal, thereby signifying an accurate velocity field.

Referring back to FIG. 7, the velocity analysis routine begins with a first block 140 that directs the processor circuit 17 to select a current CMP location and its associated CMP gather of an input data set and to select its associated time-velocity representation. Any input data set among the input data sets may be selected as the current input data set.

Figure 10:
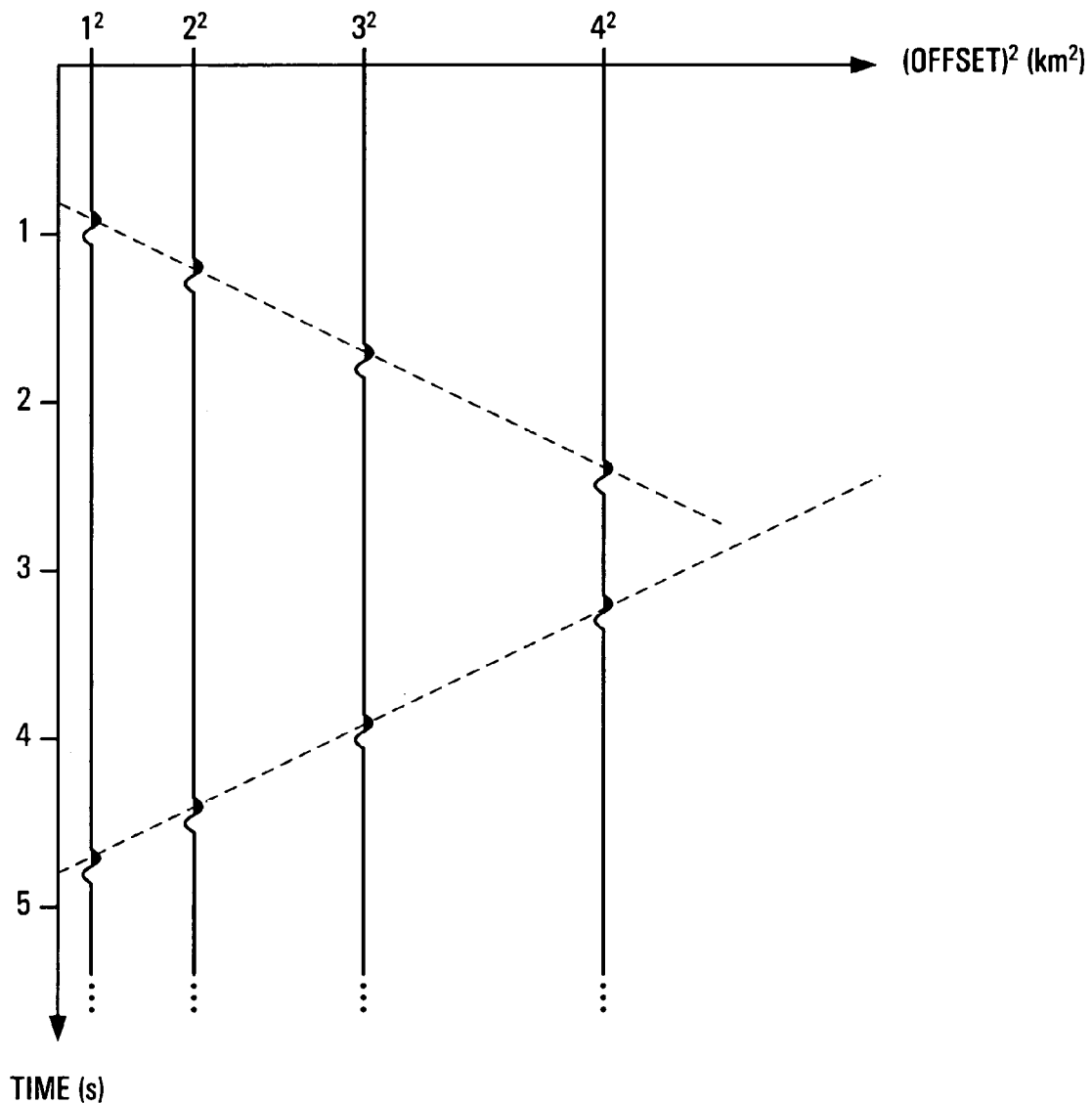
FIG. 10 is a graphical representation of the current CMP gather set of FIG. 9, shown in a time offset-squared coordinate system.

Block 141 then directs the processor circuit 17 to calculate an offset-squared value from Sx, Sy, Sz and Rx, Ry, Rz values of each time-amplitude representation 43, 45, 47, 49 of the current CMP gather associated with the current CMP location and to effectively plot the time amplitude representations of the type shown at 43, 45, 47 and 49 in a time offset-squared coordinate system as shown in FIG. 10. This coordinate system has a downwardly increasing vertical time axis and a rightwardly increasing horizontal offset-squared axis.

Figure 11:
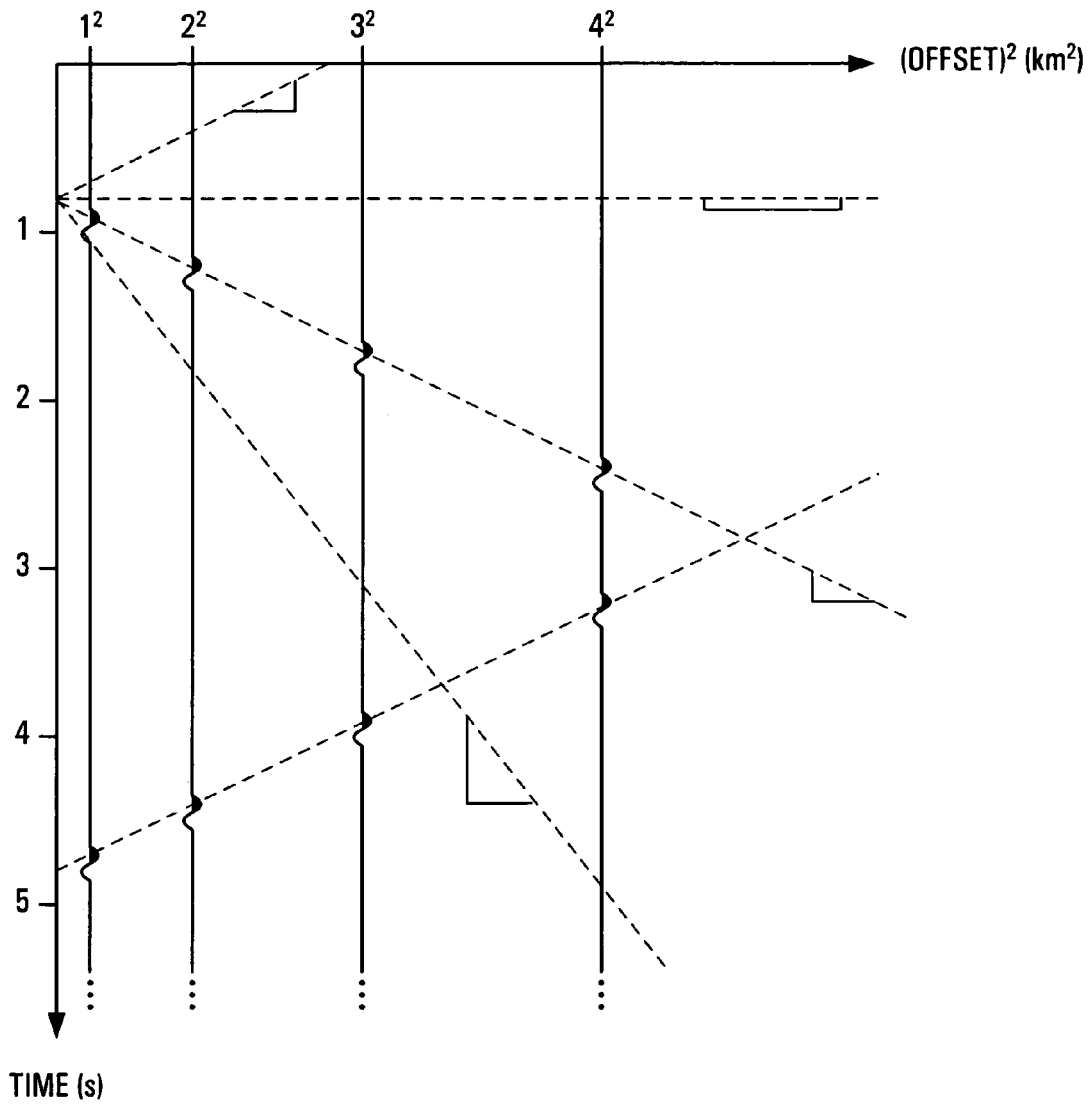
FIG. 11 is a plot of lines graphically representing Tau-slope pairs associated with the current CMP gather set of FIG. 9, shown in the time offset-squared coordinate system.
Figure 12:
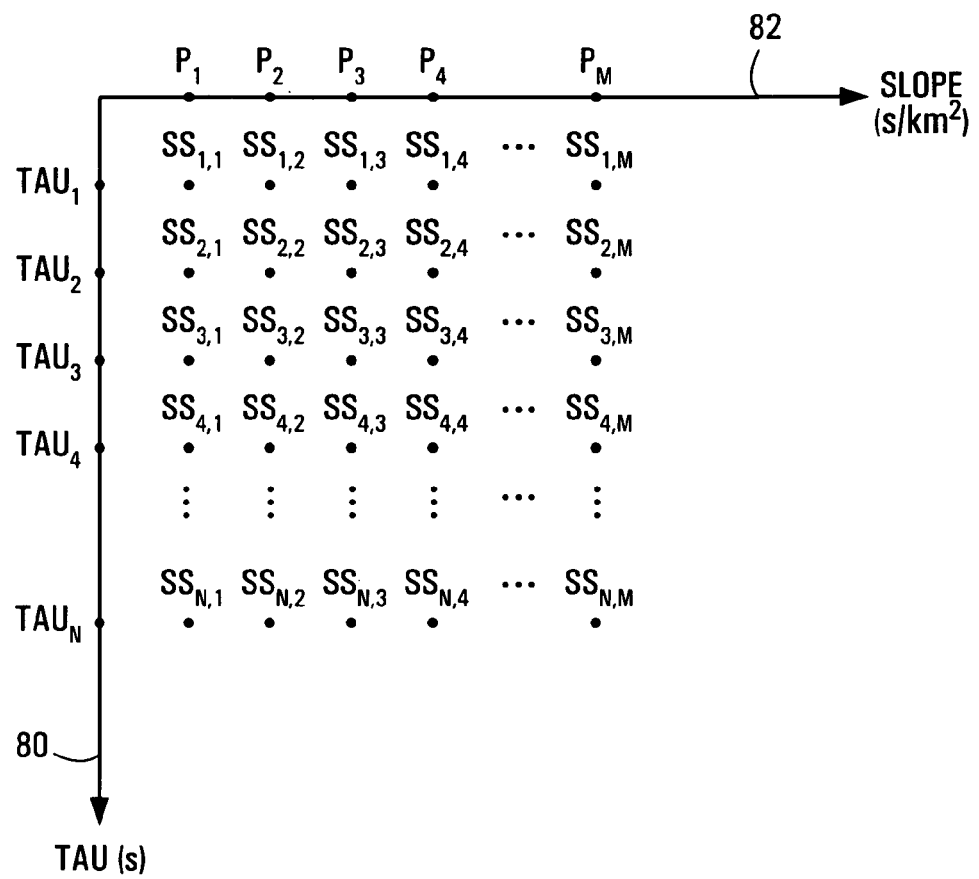
FIG. 12 is a graphical representation of slant stack values produced by the process shown in FIG. 7, shown in a Tau-slope coordinate system.

Then, block 142 directs the processor circuit 17 to produce slant stack values for a plurality of Tau-slope pairs for the current CMP gather and store them in a buffer for running window editing and smoothing. To do this, the processor circuit 17 selects time values (Tau) and for each Tau value effectively draws lines of different slopes, each line graphically representing one Tau-slope pair, in the time amplitude representations as shown in FIG. 11 and accumulates all of the amplitude values along each line to produce a slant stack value associated with each Tau-slope pair. Steps (not shown) may be taken to ensure that slope values for a given Tau value are within a practical range and meet a threshold reliability criterion. Accumulation of all of the amplitude values along a given line may include simply adding up all of the amplitude values, producing a slant stack value in a manner described in P. L. Stoffa et al., "Direct Mapping of Seismic Data to the Domain of Intercept Time and Ray Parameter—A Plane-Wave Decomposition" (1981) Geophysics 255, incorporated herein by reference, or producing a numerical combination of the sum of amplitude values and a semblance of all amplitude values associated with that Tau-slope pair, for example. The semblance may be calculated in a manner described in M. Taner et al., "Velocity Spectra—Digital Computer Derivation and Applications of Velocity Functions" (1969) 34:6 Geophysics 859, incorporated herein by reference. Thus, each Tau-slope pair is assigned a slant stack value. These slant stack values and their relationships to corresponding Tau-slope pairs may be depicted on a grid having Tau values along a vertical axis 80 and slope values along a horizontal axis 82 as shown in FIG. 12. When enough CMP gathers have been processed, as described above, to fill the running window buffer, block 142 of FIG. 7 is considered to be completed.

Still referring to FIG. 7, when the running window buffer is full, block 143 directs the processor circuit 17 to perform weighted lateral median and other filtering to produce edited and smoothed Tau-slope values for the central CMP location.

Block 144 then directs the processor circuit 17 to produce, for each Tau value of the Tau-slope pairs for the current central CMP location, a best slope value in response to the slope values and the slant stack values associated with each Tau value. The best slope value may be selected as the slope value associated with a greatest slant stack value or a greatest combined slant stack value. Alternatively, the best slope value associated with each Tau value may be calculated in response to slant stack values associated with slope values associated with that Tau value according to a best slope value equation:

$$P_{best}(\tau) = \frac{\sum_{k=1}^{m} P_k * SSV_{\tau,k}}{\sum_{k=1}^{m} SSV_{\tau,k}} \quad (4)$$

where $P_{best}^{(\tau)}$ is the best slope value associated with a given Tau value;

$\tau$ is the given Tau value;

$P_k$ is a $k^{th}$ slope value among the m distinct slope values;

m is the number of slope values associated with the given Tau value;

$SSV_{\tau,k}$ is a slant stack value associated with a Tau-slope pair formed by the given Tau value and the $k^{th}$ slope value; and k is an index value.

Additionally or alternatively, functions of $SSV_{\tau,k}$ in place of $SSV_{\tau,k}$ may be employed in equation (4). Such functions may include, for example, $SSV_{\tau,k}$ squared, $SSV_{\tau,k}$ to a predetermined power, a logarithm of $SSV_{\tau,k}$, or any combination thereof.

The best slope values produced by block 144 are associated with corresponding Tau values and therefore may be expressed in a table of best Tau-slope pairs:

| Tau Value | Best Slope Value |
| --- | --- |
| $Tau_1$ | $P_{1,best}$ |
| $Tau_2$ | $P_{2,best}$ |
| . | . |
| . | . |
| . | . |
| $Tau_n$ | $P_{n,best}$ |

Each best Tau-slope pair is associated with a plurality of amplitude values which lie along a line in the time offset-squared coordinate system shown in FIG. 11 and which are most representative of a generally horizontal strata interface such as shown at 24 in FIG. 1 within the earth's subsurface.

Referring back to FIG. 7, block 145 then directs the processor circuit 17 to produce and associate with each best slope value, a best slope reliability value. The best slope reliability value may be calculated in accordance with a best slope reliability value equation:

$$R_{(P_{best})} = \sum_{k=1}^{m} SSV_{\tau,k} \quad (5)$$

where $R_{(P_{best})}$ is the best slope reliability value associated with a given best slope value $P_{best}$;

$SSV_{\tau,k}$ is the slant stack value associated with each of m Tau-slope pairs formed by the given Tau value and the $k^{th}$ slope value.

Block 146 then directs the processor circuit 17 to produce a temporary time-velocity representation in response to the current time-velocity representation and the best slope values for the current central CMP location. To do this, the processor circuit 17 employs the current time-velocity representation associated with the current CMP location and the best slope values for the current input data set to adjust the plurality of velocity values of the time-velocity representation for the given CMP location. To produce adjusted velocity values of the temporary time-velocity representation, each velocity value at a given time value t of the time-velocity representation is adjusted in response to the best slope value associated with the Tau value corresponding to the given time value t and according to a velocity value adjustment equation:

$$V_{adj}(t) = \frac{1}{\sqrt{2\tau P_\tau + \frac{1}{V_{rep}^2}}} \quad (6)$$

where $V_{adj}(t)$ is the adjusted velocity value associated with a time value t;

$\tau$ is a Tau value equal to time value t;

$P_\tau$ is the best slope value at $\tau=t$; and $V_{rep}$ is the velocity value at time t given by the current time-velocity representation.

Using the above equation, velocity values at times t of the current time-velocity representation are adjusted to produce a temporary time-velocity representation for the current CMP location.

Block 147 then directs the processor circuit 17 to produce a weight value for each adjusted velocity value of the temporary time-velocity representation. Calculating the weight values may involve employing the adjusted velocity values to perform a NMO or migration operation on the current input data set and obtaining a measure of stretch, squeeze, or both stretch and squeeze. Obtaining a measure of stretch and/or squeeze may involve producing one or more flags indicating one or more regions of excessive stretch and/or excessive squeeze. Additionally or alternatively, calculating the weight values may involve converting the set of adjusted velocity values from RMS velocity values to interval velocity values using known techniques and producing one or more flags indicating interval velocities which exceed one or more interval velocity thresholds. One or more interval velocity thresholds may be produced in response to user input. Such user input may include regional estimates of interval velocity, general upper and lower bounds of interval velocity, or results obtained from well logs. Additionally or alternatively, calculating the weight values may involve performing a one-dimensional convolutional prediction of multiples to produce one or more estimated locations within the 3D region of one or more sources of multiple reflections.

A greater weight value may indicate an expectation that an associated adjusted velocity value is valid and reliable. A lesser weight value may indicate an expectation that an associated adjusted velocity value is of lesser reliability or invalid. Furthermore, each weight value also indicates the validity of the best slope value employed to produce the associated adjusted velocity value.

Block 148 then directs the processor circuit 17 to produce conditioned best slope values in response to the best slope values produced at block 144, the best slope reliability values produced at block 145 and associated with the best slope values, and the weight values produced at block 147 and associated with the adjusted velocity values of the temporary time-velocity representation. Conditioning the best slope values may involve removing best slope values associated with a zero weight value and emphasizing or suppressing other best slope values. Additionally or alternatively, conditioning the best slope values may involve weighted median filtering or weighted mean filtering, for example. Additionally or alternatively, conditioning the best slope values may involve lateral conditioning of a plurality of best slope values associated with similarly valued Tau values. Such lateral conditioning may reduce an extent of variation in best slope value between neighbouring best slope values. In any event, the result of block 148 is a set of conditioned best slope values associated with respective Tau values.

Block 149 then directs the processor circuit 17 to produce an adjusted time-velocity representation for the current CMP location by adjusting the plurality of velocity values of the temporary time-velocity representation in response to the conditioned best slope values, according to equation (6) above.

Block 151 directs the processor circuit 17 to determine whether all CMP locations have been considered. If not, block 153 directs the processor circuit 17 to select another CMP gather and the processor circuit 17 is directed back to block 141 to repeat the processes of blocks 141 to 151 until adjusted time-velocity representations for all CMP locations have been produced.

Once all adjusted time-velocity representations respectively associated with all CMP locations have been produced, block 150 directs the processor circuit 17 to produce an output velocity field in response to the adjusted time-velocity representations respectively associated with all CMP locations. This may involve laterally conditioning the adjusted time-velocity representations. Lateral conditioning may involve weighted median filtering or arithmetic smoothing of the adjusted time-velocity representations associated with a neighbourhood of similarly located CMP locations so as to limit gradients of velocity values therein. The resulting adjusted and laterally conditioned time-velocity representations collectively may be referred to as the output velocity field. The output velocity field acts as the migrated velocity field referred to in block 132 of FIG. 6. Referring back to FIG. 6, after the migrated velocity field has been produced, the processor circuit 17 is returned to block 114 of FIG. 4.

Referring back to FIG. 4, after the migrated starting velocity field has been produced, block 180 directs the processor circuit 17 to perform a 2D prestack imaging (PSI) process on the 2D array of seismic data to produce PSI gathers. Block 182 then directs the processor circuit 17 to perform a NMO operation on the PSI gathers using the migrated starting velocity field.

Block 184 then directs the processor circuit 17 to adjust the migrated starting velocity field using the NMO'd PSI gathers and the migrated starting velocity field. Block 184 of FIG. 4 essentially causes the process shown in FIG. 7 to be provided with the migrated starting velocity field as an input velocity field and the NMO'd PSI gathers as the input data set. The process shown in FIG. 7 is executed on these inputs as described above and produces an output velocity field which is returned to the processor circuit 17 at block 184 and which acts as an initial velocity field for the control plane.

If at block 113 the processor circuit 17 determines that an imaging velocity is not to be calculated, i.e. a DMO or brute velocity is sought, the process of FIG. 4 is completed and the processor circuit 17 is returned to block 108 of FIG. 3.

Figure 13:
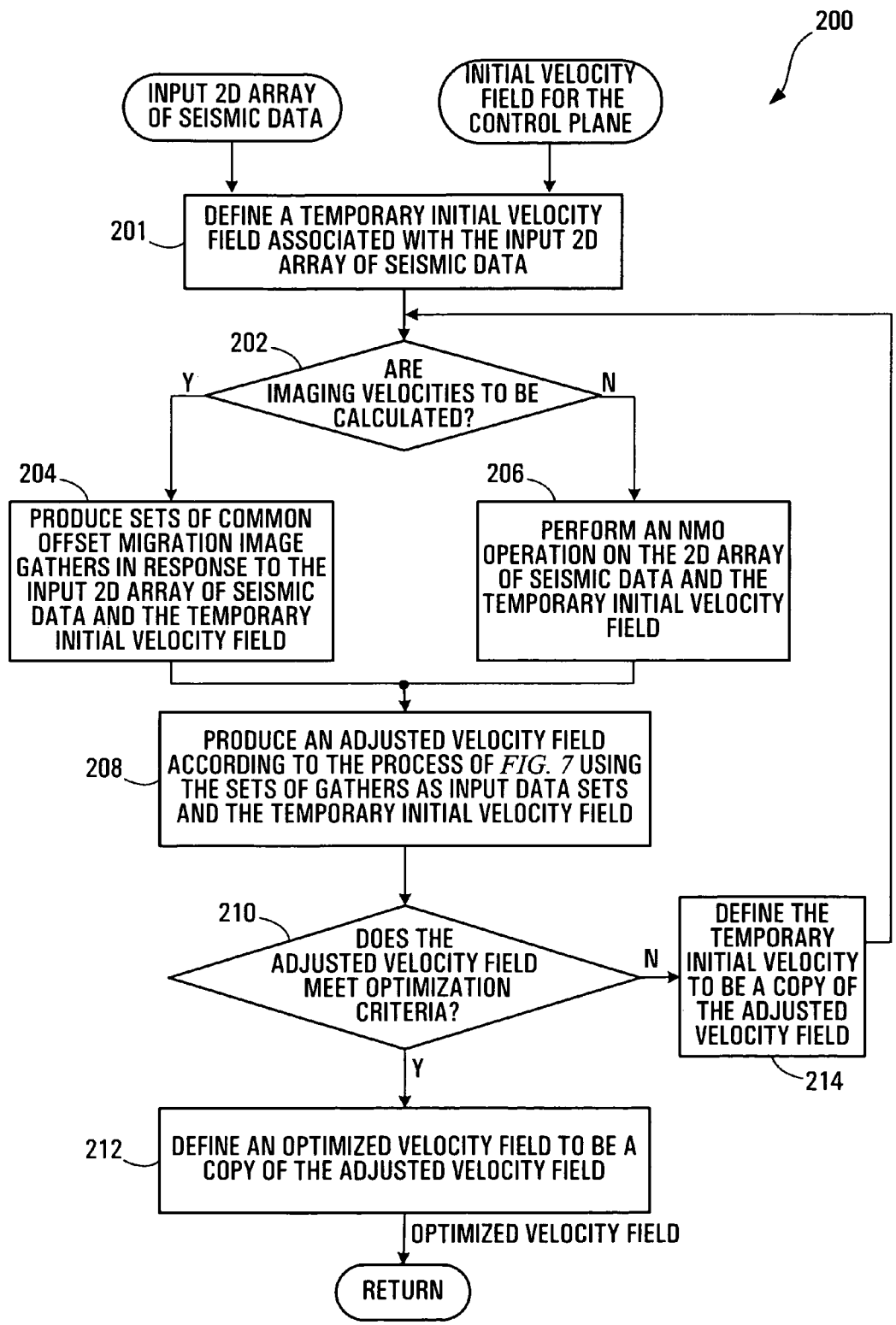
FIG. 13 is a flow chart representing blocks of code executed by the processor of the system shown in FIG. 1, for producing an optimized velocity field in response to the initial velocity field for the control plane and an input 2D array of seismic data.

Referring back to FIG. 3, after the initial velocity field for the control plane has been produced, block 109 directs the processor circuit 17 to produce an optimized velocity field for the control plane by the process shown generally at 200 in FIG. 13.

Referring to FIG. 13, in general, the process involves producing an optimized velocity field in response to an initial velocity field and seismic data comprising time-amplitude representations associated with source-receiver locations spaced apart by an offset distance and having a midpoint therebetween, the seismic data being arranged into common midpoint (CMP) gathers associated with respective CMP locations. In general, the process involves defining a temporary initial velocity field associated with the seismic data, producing a set of gathers in response to the temporary initial velocity field, according to a type of velocity field desired to be produced, producing an adjusted velocity field in response to the set of gathers and the temporary initial velocity field and outputting the adjusted velocity field when the adjusted velocity field meets optimization criteria.

In particular, in connection with the overall process described herein, the process shown at 200 produces an optimized velocity field in response to the 2D array of seismic data associated with the control plane and an initial velocity field for the control plane.

The process 200 begins with a first block 201 that directs the processor circuit 17 to define a temporary initial velocity field and associate it with the input 2D array of seismic data. Block 202 then directs the processor circuit 17 to determine whether imaging velocities are to be calculated.

If imaging velocities are to be calculated, block 204 directs the processor circuit 17 to produce sets of common offset migration image gathers in response to the input 2D array of seismic data and the temporary initial velocity field. Alternatively, if imaging velocities are not to be calculated, block 206 directs the processor circuit 17 to perform an NMO operation on the 2D array of seismic data using the temporary initial velocity field. Both blocks 204 and 206 produce data that may be referred to as sets of gathers and block 208 directs the processor circuit 17 to adjust the temporary initial velocity field in response to the sets of gathers produced by either of these blocks to produce an adjusted velocity field. To do this, block 208 directs the circuit 17 to call the process shown in FIG. 7 and to use the adjusted temporary initial velocity field as the input velocity field and to use the sets of gathers as the input data set and to return an output velocity field. Referring back to FIG. 13, block 208 treats the returned output velocity field as an adjusted velocity field.

Block 210 then directs the processor circuit 17 to determine whether the adjusted velocity field meets optimization criteria. The optimization criteria may be a maximum difference in velocity values between the adjusted velocity field and the temporary initial velocity field, for example. Other means of determining whether the adjusted velocity field meets the optimization criteria may involve producing a minimum semblance or cross correlation value calculated from the sets of gathers, producing a minimum stack power value for a set of stacked image gathers obtained by stacking respective sets of gathers, or producing a varimax value calculated from the sets of gathers.

If the optimization criteria of block 210 are not met, block 214 directs the processor circuit 17 to define the temporary initial velocity field to be a copy of the adjusted velocity field. The processor circuit 17 is then directed back to block 202. Thus, blocks 202, 204, 206, 208, 210 and 214 direct the processor circuit 17 to iteratively adjust the temporary initial velocity field until the optimization criteria are met.

When the optimization criteria of block 210 are met, block 212 directs the processor circuit 17 to define an optimized velocity field by taking a copy of the adjusted velocity field that has met the optimization threshold. The process shown in FIG. 13 is then ended and the processor circuit 17 is directed back to block 108 of FIG. 3 which provides the optimized velocity field as output. The process shown in FIG. 3 is thus concluded and the processor circuit 17 is returned to block 23 of FIG. 2. An optimized velocity field associated with a control plane defined within the 3D region has thus been produced and optimized.

Figure 14:
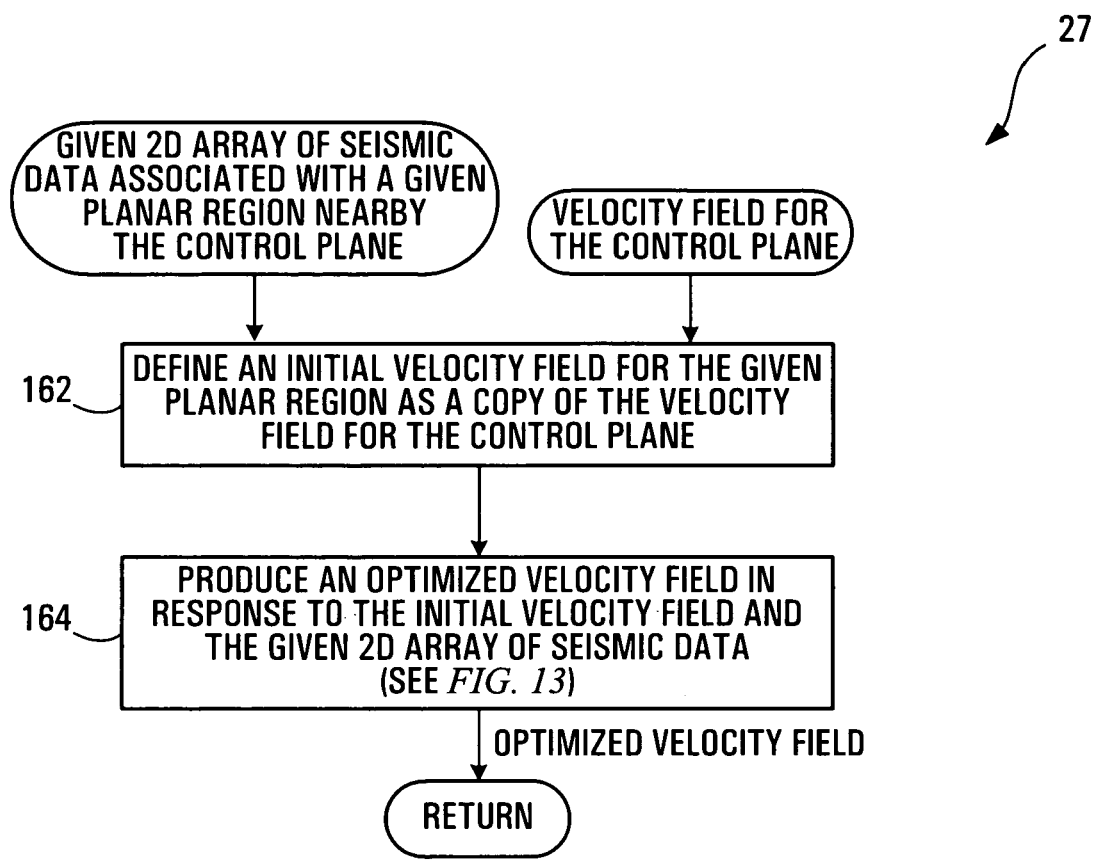
FIG. 14 is a flow chart representing blocks of code executed by the processor of the system shown in FIG. 1, for producing an optimized velocity field for a given planar region in response to a velocity field associated with the control plane.

Still referring to FIG. 2, after block 23 has directed the processor circuit 17 to produce and optimize a velocity field associated with a control plane in the 3D region, block 25 directs the processor circuit 17 to determine whether or not there is more than one plane in the 3D region. If there is more than one plane, block 27 directs the processor circuit 17 to employ the velocity field associated with the control plane to produce an optimized velocity field for a planar region nearby the control plane. To do this, block 27 directs the processor circuit 17 to execute the functions shown in FIG. 14. A first function is depicted by block 162 and directs the processor circuit 17 to define an initial velocity field for the given planar region as a copy of the velocity field for the control plane. Then, block 164 directs the processor circuit 17 to produce an optimized velocity field according to the process shown in FIG. 13 in response to the initial velocity field and the 2D array of seismic data associated with the control plane. Referring back to FIG. 2, on completion of block 27, an optimized velocity field for the planar region near the control plane is available and block 29 directs the processor circuit 17 to determine whether optimized velocity fields have been produced for all planar regions defined in the 3D region. If optimized velocity fields have not been produced, block 31 directs the processor circuit 17 to designate a planar region nearby the control plane as a new control plane and causes the processor circuit 17 to select a new planar region nearby the new control plane. The processor circuit 17 is then directed back to block 27 to repeat the functions shown in FIG. 14 with the new control plane acting as the control plane and the optimized velocity field produced for the former control plane as the starting velocity field which is optimized for the planar region nearby the new control plane.

Referring back to FIG. 2, blocks 27, 29 and 31 are repeated until optimized velocity fields have been produced for all planar regions defined in the 3D region. When this occurs, and when there is only one plane defined in the 3D region (i.e. where 2D seismic data has been provided to the process and detected as only one plane in the 3D region at block 25), block 33 directs the processor circuit 17 to apply final editing and smoothing to the optimized velocity field or fields produced by the process).

The finally edited and smoothed velocity fields produced at block 33 may collectively be referred to as a 3D velocity field. When a 3D velocity field has been produced, the process shown in FIG. 2 is complete.

While specific embodiments of the invention have been described and illustrated, such embodiments should be considered illustrative of the invention only and not as limiting the invention as construed in accordance with the accompanying claims.

What is claimed is:

1. A method for producing an initial velocity field estimate for a control plane from seismic data associated with said control plane and comprising time-amplitude representations associated with source-receiver locations spaced apart by an offset distance and having a midpoint therebetween, the seismic data being arranged into common midpoint (CMP) gathers associated with respective CMP locations and the control plane having an edge intersecting a plurality of the CMP locations, the method comprising:
   a) producing a starting velocity field estimate from an initial range of velocity values and an initial range of time values;
   b) producing a migrated starting velocity field from said starting velocity field estimate and said seismic data;
   c) producing pre-stack imaged gathers by performing a 2-dimensional pre-stack imaging process on said seismic data;
   d) producing normal moveout gathers in response to said migrated starting velocity field, including performing a normal moveout operation on said pre-stack imaged gathers;
   e) adjusting said migrated starting velocity field in response to said normal moveout gathers and said migrated starting velocity field to produce a plurality of time-velocity values for each of the OMP locations, said plurality of said time-velocity values acting as said initial velocity field.

2. The method of claim 1 wherein producing said starting velocity field estimate comprises defining a range of velocity values, defining one or more ranges of time values and associating each velocity value of said range of velocity values with one or more corresponding ranges of time values.

3. The method of claim 2 further comprising, for each of a plurality of OMP gathers, defining a window in which a selected CMP location associated with said each CMP gather is centered.

4. The method of claim 3 further comprising producing a semblance panel associated with said selected CMP location, in response to said range of velocity values and selected CMP gathers associated with CMP locations within said window.

5. The method of claim 4 further comprising producing a time-velocity profile associated with said selected CMP location in response to said semblance panel and a set of velocity stacking weights.

6. The method of claim 5 further comprising producing smoothing weights for each velocity value of said range of velocity values and each time value of said one or more corresponding ranges of time values in response to respective products of total semblance and reciprocal velocity gradient associated with said each time value and said each velocity value.

7. The method of claim 6 further comprising producing a smooth time-velocity profile associated with said selected CMP location in response to said time-velocity profile and said smoothing weights.

8. The method of claim 7 further comprising producing laterally edited and laterally smoothed time-velocity profiles in response to a plurality of said smooth time-velocity profiles.

9. The method of claim 1 wherein producing said migrated starting velocity field comprises, for said each of the CMP locations, producing a normal moveout gather in response to said starting velocity field estimate and seismic data associated with said each CMP locations.

10. The method of claim 9 further comprising producing a CMP stack for said each CMP location in response to a corresponding said normal moveout gather.

11. The method of claim 10 further comprising producing a simulated CMP gather for said each CMP location in response to a corresponding said CMP stack and a corresponding time-velocity profile associated with said each CMP location.

12. The method of claim 11 further comprising producing pre-stack imaged simulated gathers in response to a plurality of respective said simulated CMP gathers and respective said CMP locations.

13. The method of claim 12 further comprising producing normal moveout pre-stack imaged simulated gathers in response to said pre-stack imaged simulated gathers, said CMP locations and said starting velocity field estimate.

14. The method of claim 13 wherein producing said migrated velocity field comprises producing said migrated velocity field in response to said normal moveout pre-stack imaged simulated gathers and said starting velocity field estimate.

15. The method of claim 14 wherein producing said migrated velocity field comprises, for said each CMP location and for each of said common seismic events, finding a slope of a curve approximating a trend, relative to offset, in said time values, associated with said each common seismic event.

16. The method of claim 15 wherein finding said slope of said curve comprises producing slant stack values for a plurality of time(tau)-slope pairs.

17. The method of claim 16 further comprising, for said each CMP location, producing for each time value of said time(tau)-slope pairs a best slope value in response to said time(tau)-slope pairs and said slant stack values.

18. The method of claim 17 further comprising producing a first temporary time-velocity representation in response to said starting velocity field estimate and a plurality of said best slope values.

19. The method of claim 18 wherein producing said first temporary time-velocity representation comprises adjusting each velocity value at a given time t of a corresponding time-velocity representation of said starting velocity field estimate according to the relation:

$$V_{adj}(t) = \frac{1}{\sqrt{2\tau P_\tau + \frac{1}{V_{rep}^2}}}$$

where
   $V_{adj}(t)$ is an adjusted velocity value associated with said given time t;
   $\tau$ is a Tau value equal to said given time t;
   $p_\tau$ is said best slope value at r=t; and
   $V_{rep}$ is said each velocity value at said given time t of said corresponding time-velocity representation.

20. The method of claim 19 further comprising conditioning said plurality of best slope values to produce conditioned best slope values and producing an adjusted time-velocity representation in response to said temporary time-velocity representation and said conditioned best slope values according to said relation.

21. The method of claim 20 wherein adjusting said migrated starting velocity field comprises, for each of the CMP locations and for each of said common seismic events, finding a slope of a curve approximating said trend, relative to offset, in said time values, associated with said each common seismic event.

22. The method of claim 21 wherein finding said slope of said curve-comprises producing slant stack values for a plurality of time(tau)-slope pairs.

23. The method of claim 22 further comprising, for said each CMP location, producing for each time value of said time(tau)-slope pairs a best slope value in response to said time(tau)-slope pairs and said slant stack values.

24. The method of claim 23 further comprising producing a second temporary time-velocity representation in response to said migrated starting velocity field and a plurality of said best slope values.

25. The method of claim 24 wherein producing said second temporary time-velocity representation comprises adjusting each velocity value at a given time t of a corresponding time-velocity representation of said migrated starting velocity field according to a relation:

$$V_{adj}(t) = \frac{1}{\sqrt{2\tau P_\tau + \frac{1}{V_{rep}^2}}}$$

where $V_{adj}$ (t) is an adjusted velocity value associated with said given time t;

τ is a Tau value equal to said given time y $P_\tau$ is said best slope value at r=t; and $V_{rep}$ is said each velocity value at said given time t of said corresponding time-velocity representation.

26. The method of claim 25 further comprising conditioning said plurality of best slope values to produce conditioned best slope values and adjusting said migrated starting velocity field in response to said temporary time-velocity representation and said conditioned best slope values according to said relation.

27. A computer readable medium encoded with codes for directing a processor circuit to carry out the method of claim 1.

28. A computer readable signal encoded with codes for directing a processor circuit to carry out the method of claim 1.

29. An apparatus for producing an initial velocity field estimate for a control plane from seismic data associated with said control plane and comprising time-amplitude representations associated with source-receiver locations spaced apart by an offset distance and having a midpoint therebetween, the seismic data being arranged into common midpoint (CMP) gathers associated with respective CMP locations and the control plane having an edge intersecting a plurality of the OMP locations, the apparatus comprising:

a) means for producing a starting velocity field estimate from an initial range of velocity values and an initial range of time values;

b) means for producing a migrated starting velocity field from said starting velocity field estimate and said seismic data;

c) means for producing pre-stack imaged gathers by performing a 2-dimensional pre-stack imaging process on said seismic data;

d) means for producing normal moveout gathers in response to said migrated starting velocity field, including performing a normal moveout operation on said pre-stack imaged gathers;

e) means for adjusting said migrated starting velocity field in response to said normal moveout gathers and said migrated starting velocity field to produce a plurality of time-velocity values for each of the CMP locations, said plurality of said time-velocity values acting as said initial velocity field.

30. An apparatus for producing an initial velocity field estimate for a control plane from seismic data associated with said control plane and comprising time-amplitude representations associated with source-receiver locations spaced apart by an offset distance and having a midpoint therebetween, the seismic data being arranged into common midpoint (CMP) gathers associated with respective CMP locations and the control plane having an edge intersecting a plurality of the CMP locations, the apparatus comprising:

a) a component configured to produce a starting velocity field estimate from an initial range of velocity values and an initial range of time values;

b) a component configured to produce a migrated starting velocity field from said starting velocity field estimate and said seismic data;

c) a component configured to produce pre-stack imaged gathers by performing a 2-dimensional pre-stack imaging process on said seismic data;

d) a component configured to produce normal moveout gathers in response to said migrated starting velocity field, including performing a normal moveout operation on said pre-stack imaged gathers;

e) a component configured to adjust said migrated starting velocity field in response to said normal moveout gathers and said migrated starting velocity field to produce a plurality of time-velocity values for each of the CMP locations, said plurality of said time-velocity values acting as said initial velocity field.

31. The apparatus of claim 30 wherein said component configured to produce said starting velocity field estimate comprises a processor circuit configured to define a range of velocity values, define one or more ranges of time values and associate each velocity value of said range of velocity values with one or more corresponding ranges of time values.

32. The apparatus of claim 31 wherein said processor circuit is configured to, for each of a plurality of CMP gathers, define a window in which a selected CMP location associated with said each OMP gather is centered.

33. The apparatus of claim 32 wherein said processor circuit is configured to produce a semblance panel associated with said selected CMP location, in response to said range of velocity values and selected CMP gathers associated with CMP locations within said window.

34. The apparatus of claim 33 wherein said processor circuit is configured to produce a time-velocity profile associated with said selected CMP location in response to said semblance panel and a set of velocity stacking weights.

35. The apparatus of claim 34 wherein said processor circuit is configured to produce smoothing weights for each velocity value of said range of velocity values and each time value of said one or more corresponding ranges of time values in response to respective products of total semblance and reciprocal velocity gradient associated with said each time value and said each velocity value.

36. The apparatus of claim 35 wherein said processor circuit is configured to produce a smooth time-velocity profile associated with said selected CMP location in response to said time-velocity profile and said smoothing weights.

37. The apparatus of claim 36 wherein said processor circuit is configured to produce laterally edited and laterally smoothed time-velocity profiles in response to a plurality of said smooth time-velocity profiles.

38. The apparatus of claim 30 wherein said component configured to produce said migrated starting velocity field comprises said processor and wherein said processor is configured to, for said each of the CMP location, produce a normal moveout gather in response to said starting velocity field estimate and seismic data associated with said each CMP location.

39. The apparatus of claim 38 wherein said processor circuit is configured to produce a CMP stack for said each CMP location in response to a corresponding said normal moveout gather.

40. The apparatus of claim 39 wherein said processor circuit is configured to produce a simulated CMP gather for said each CMP location in response to a corresponding said CMP stack and a corresponding time-velocity profile associated with said each OMP location.

41. The apparatus of claim 40 wherein said processor circuit is configured to produce pre-stack imaged simulated gathers in response to a plurality of respective said simulated CMP gathers and respective said CMP locations.

42. The apparatus of claim 41 wherein said processor circuit is configured to produce normal moveout pre-stack imaged simulated gathers in response to said pre-stack imaged simulated gathers, said CMP locations and said starting velocity field estimate.

43. The apparatus of claim 42 wherein said processor circuit is configured to produce said migrated velocity field by producing said migrated velocity field in response to said normal moveout pre-stack imaged simulated gathers and said starting velocity field estimate.

44. The apparatus of claim 43 wherein said processor circuit is configured to produce said migrated velocity field by, for said each CMP location and for each of said common seismic events, finding a slope of a curve approximating a trend, relative to offset, in said time values, associated with said each common seismic event.

45. The apparatus of claim 44 wherein said processor circuit is configured to find said slope of said curve by producing slant stack values for a plurality of time(tau)-slope pairs.

46. The apparatus of claim 45 wherein said processor circuit is configured to, for said each CMP location, produce for each time value of said time(tau)-slope pairs a best slope value in response to said time(tau)-slope pairs and said slant stack values.

47. The apparatus of claim 46 wherein said processor circuit is configured to produce a first temporary time-velocity representation in response to said starting velocity field estimate and a plurality of said best slope values.

48. The apparatus of claim 47 wherein said processor circuit is configured to produce said first temporary time-velocity representation by adjusting each velocity value at a given time t of a corresponding time-velocity representation of said starting velocity field estimate according to the relation:

$$V_{adj}(t) = \frac{1}{\sqrt{2\tau P_\tau + \frac{1}{V_{rep}^2}}}$$

where
$V_{adj}(t)$ is an adjusted velocity value associated with said given time t;
$\tau$ is a Tau value equal to said given time t
$P_\tau$ is said best slope value at $\tau = t$; and
$V_{rep}$ is said each velocity value at said given time t of said corresponding time-velocity representation.

49. The apparatus of claim 48 wherein said processor circuit is configured to condition said plurality of best slope values to produce conditioned best slope values and produce an adjusted time-velocity representation in response to said temporary time-velocity representation and said conditioned best slope values according to said relation.

50. The apparatus of claim 49 wherein said component configured to adjust said migrated starting velocity field comprises said processor circuit configured to, for each of the CMP locations and for each of said common seismic events, find a slope of a curve approximating said trend, relative to offset, in said time values, associated with said each common seismic event.

51. The apparatus of claim 50 wherein said processor circuit is configured to find said slope of said curve by producing slant stack values for a plurality of time(tau)-slope pairs.

52. The apparatus of claim 51 wherein said processor circuit is configured to, for said each CMP location, produce for each time value of said time(tau)-slope pairs a best slope value in response to said time(tau)-slope pairs and said slant stack values.

53. The apparatus of claim 52 wherein said processor circuit is configured to produce a second temporary time-velocity representation in response to said migrated starting velocity field and a plurality of said best slope values.

54. The apparatus of claim 53 wherein said processor circuit is configured to produce said second temporary time-velocity representation by adjusting each velocity value at a given time t of a corresponding time-velocity representation of said migrated starting velocity field according to a relation:

$$V_{adj}(t) = \frac{1}{\sqrt{2\tau P_\tau + \frac{1}{V_{rep}^2}}}$$

where
$V_{adj}(t)$ is an adjusted velocity value associated with said given time t;
$\tau$ is a Tau value equal to said given time t;
$p_{96}$ is said best slope value at $\tau = t$; and
$V_{rep}$ is said each velocity value at said given time t of said corresponding time-velocity representation.

55. The apparatus of claim 54 wherein said processor circuit is configured to condition said plurality of best slope values to produce conditioned best slope values and adjust said migrated starting velocity field in response to said temporary time-velocity representation and said conditioned best slope values according to said relation.

* * * * *